US012724666B2

(12) United States Patent
Sugimoto

(10) Patent No.: US 12,724,666 B2
(45) Date of Patent: Sep. 1, 2026

(54) SEMICONDUCTOR DEVICE

(71) Applicant: ROHM CO., LTD., Kyoto (JP)

(72) Inventor: Yasuhito Sugimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 56 days.

(21) Appl. No.: 18/887,499

(22) Filed: Sep. 17, 2024

(65) Prior Publication Data

US 2025/0015799 A1 Jan. 9, 2025

Related U.S. Application Data

(63) Continuation of application No. PCT/JP2022/047346, filed on Dec. 22, 2022.

(30) Foreign Application Priority Data

Mar. 18, 2022 (JP) ................................ 2022-043469

(51) Int. Cl.
*G06F 11/10* (2006.01)

(52) U.S. Cl.
CPC ................................ *G06F 11/1004* (2013.01)

(58) Field of Classification Search
CPC ............... G06F 11/073; G06F 11/0772; G06F 11/1048; G06F 11/1004; G11C 29/44; G11C 29/52
See application file for complete search history.

(56) References Cited

U.S. PATENT DOCUMENTS 9,389,953 B2 * 7/2016 Choi .................. G06F 11/1048
9,852,811 B2 * 12/2017 Chang .................. G11C 29/52
11,392,102 B2 7/2022 Fujimura et al.
2020/0272120 A1 8/2020 Fujimura et al.
2021/0042189 A1 * 2/2021 Whately ............ G06F 11/1044
2022/0121514 A1 * 4/2022 Walker .................... G06F 11/10

FOREIGN PATENT DOCUMENTS

JP 2021029084 A 2/2021
WO 2019065395 A1 4/2019

OTHER PUBLICATIONS

International Search Report for International Application No. PCT/JP2022/047346; mailed Mar. 7, 2023.
PCT Written Opinion of the International Search Authority for International Application No. PCT/JP2022/047346; mailed Mar. 7, 2023.

* cited by examiner

*Primary Examiner* — Joseph R Kudirka
(74) *Attorney, Agent, or Firm* — CANTOR COLBURN LLP

(57) ABSTRACT

A control circuit provided in a semiconductor device receives an input data signal during a selection period in which a selection signal has a predetermined level in synchronization with a clock signal and performs a corresponding operation corresponding to the input data signal during the selection period or after the selection period. The control circuit holds an error flag indicating whether a specific error has occurred, outputs, during a part of the selection period, a response signal corresponding to the input data signal from a data output terminal and outputs, during another part of the selection period, an error flag signal corresponding to the value of the error flag from the data output terminal.

15 Claims, 13 Drawing Sheets

FIG.6

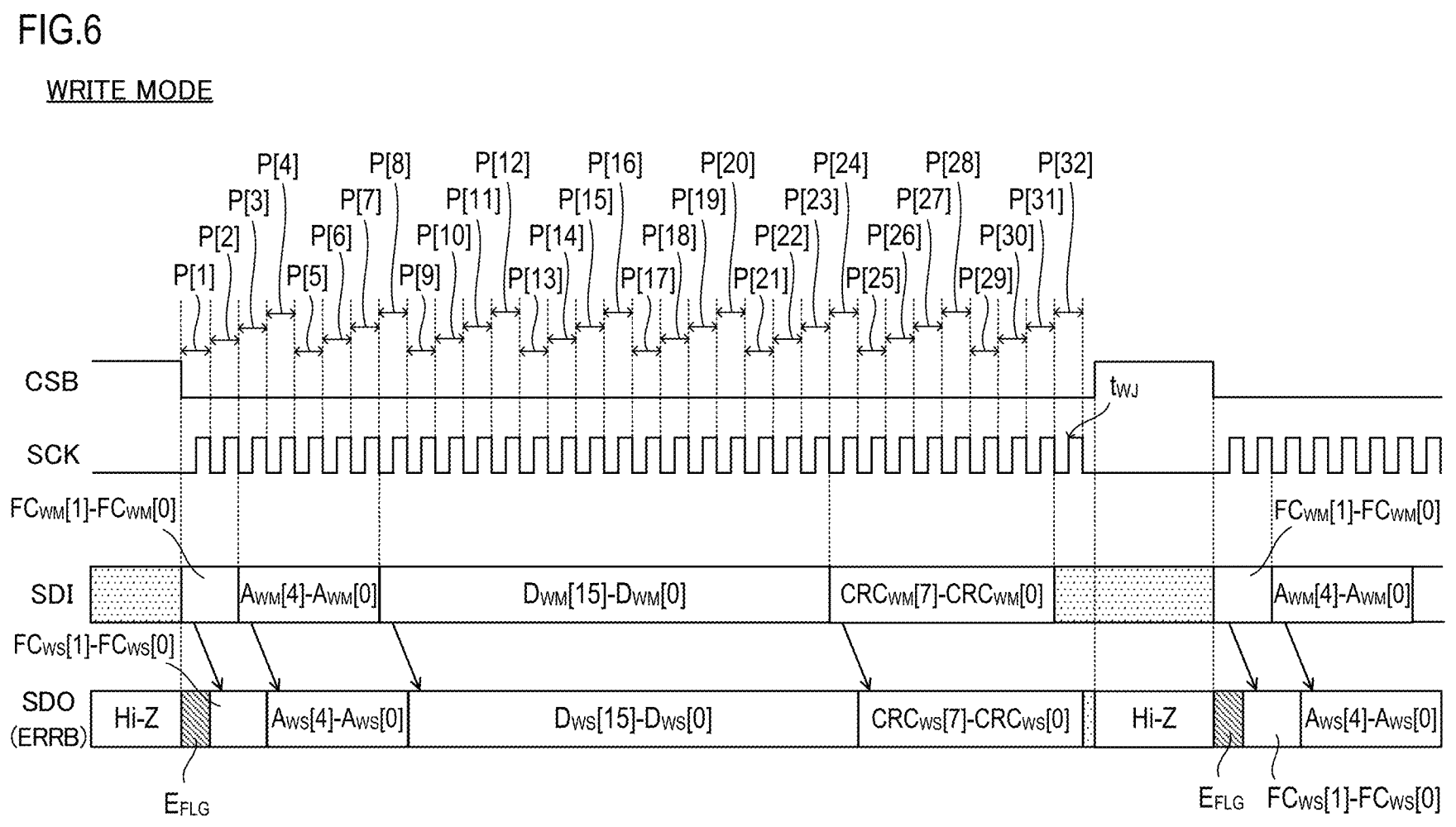

WRITE MODE

CSB

SCK $FC_{WM}[1]$-$FC_{WM}[0]$

SDI $FC_{WS}[1]$-$FC_{WS}[0]$

SDO (ERRB)

P[1] P[2] P[3] P[4] P[5] P[6] P[7] P[8] P[9] P[10] P[11] P[12] P[13] P[14] P[15] P[16] P[17] P[18] P[19] P[20] P[21] P[22] P[23] P[24] P[25] P[26] P[27] P[28] P[29] P[30] P[31] P[32]

$t_{WJ}$ $A_{WM}[4]$-$A_{WM}[0]$ $D_{WM}[15]$-$D_{WM}[0]$ $CRC_{WM}[7]$-$CRC_{WM}[0]$ $FC_{WM}[1]$-$FC_{WM}[0]$ $A_{WM}[4]$-$A_{WM}[0]$

Hi-Z $E_{FLG}$ $A_{WS}[4]$-$A_{WS}[0]$ $D_{WS}[15]$-$D_{WS}[0]$ $CRC_{WS}[7]$-$CRC_{WS}[0]$

Hi-Z $E_{FLG}$ $FC_{WS}[1]$-$FC_{WS}[0]$ $A_{WS}[4]$-$A_{WS}[0]$

FIG.7

| $E_{FLG}$ | 0 | 1 |
|---|---|---|
| ERRB | HI | LOW |

FIG.8

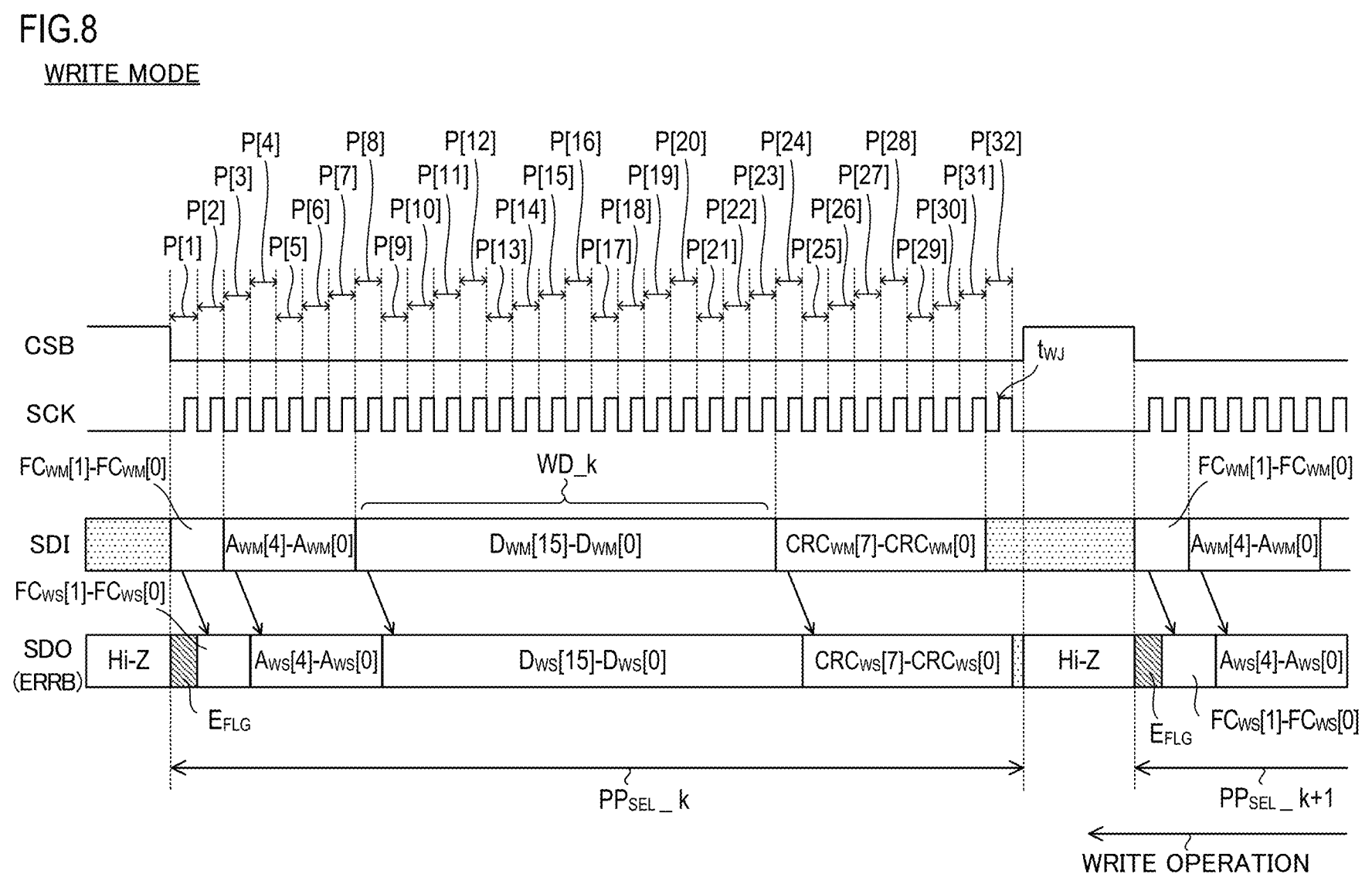

WRITE MODE

CSB

SCK $FC_{WM}[1]$-$FC_{WM}[0]$

SDI $FC_{WS}[1]$-$FC_{WS}[0]$

SDO (ERRB)

P[1] P[2] P[3] P[4] P[5] P[6] P[7] P[8] P[9] P[10] P[11] P[12] P[13] P[14] P[15] P[16] P[17] P[18] P[19] P[20] P[21] P[22] P[23] P[24] P[25] P[26] P[27] P[28] P[29] P[30] P[31] P[32]

$t_{WJ}$

WD_k $A_{WM}[4]$-$A_{WM}[0]$ $D_{WM}[15]$-$D_{WM}[0]$ $CRC_{WM}[7]$-$CRC_{WM}[0]$ $FC_{WM}[1]$-$FC_{WM}[0]$ $A_{WM}[4]$-$A_{WM}[0]$

Hi-Z $E_{FLG}$ $A_{WS}[4]$-$A_{WS}[0]$ $D_{WS}[15]$-$D_{WS}[0]$ $CRC_{WS}[7]$-$CRC_{WS}[0]$

Hi-Z $E_{FLG}$ $FC_{WS}[1]$-$FC_{WS}[0]$ $A_{WS}[4]$-$A_{WS}[0]$ $PP_{SEL}$_k $PP_{SEL}$_k+1

WRITE OPERATION

FIG.9

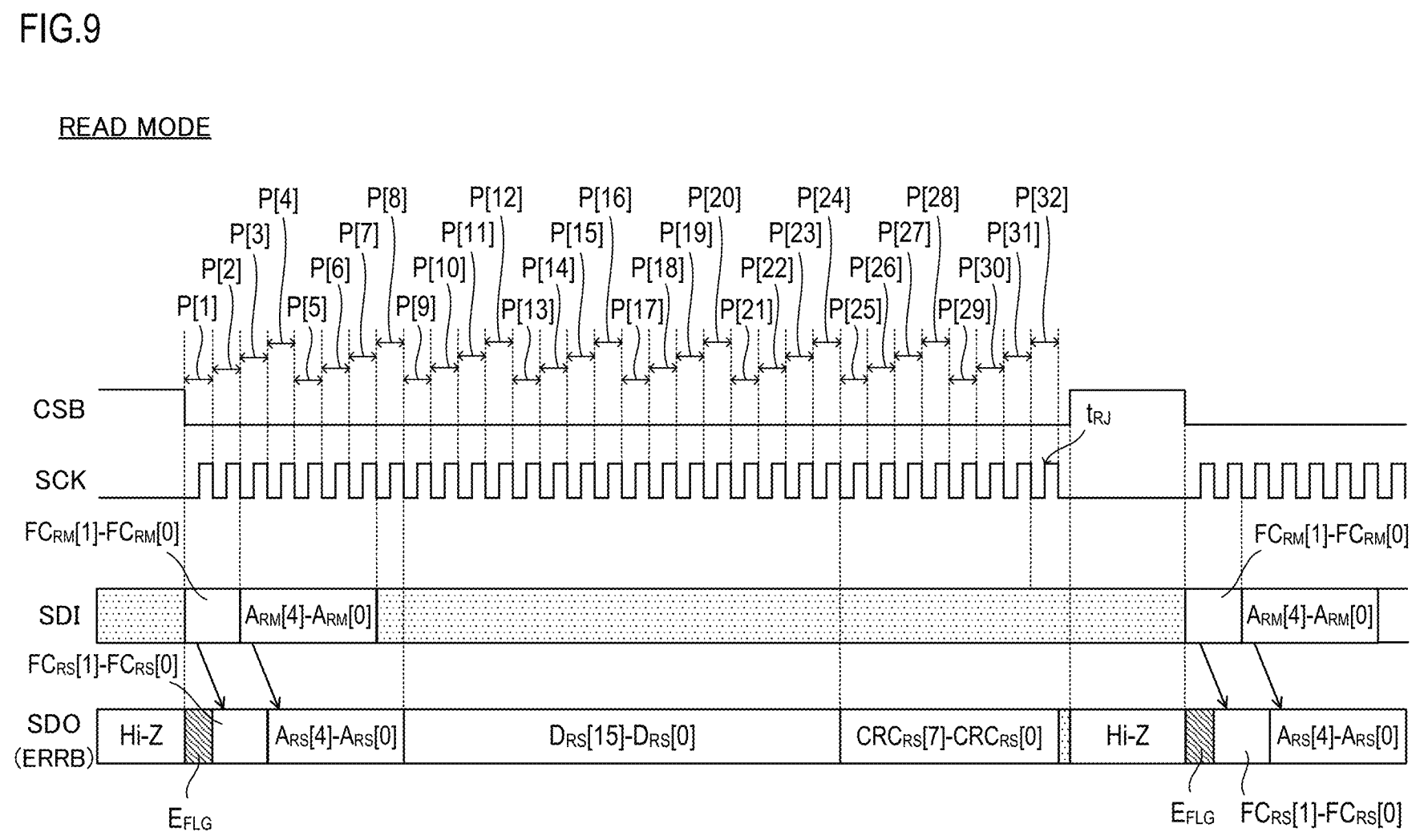

READ MODE

CSB
SCK
$FC_{RM}[1]$-$FC_{RM}[0]$
SDI
$FC_{RS}[1]$-$FC_{RS}[0]$
SDO (ERRB)

P[1] P[2] P[3] P[4] P[5] P[6] P[7] P[8] P[9] P[10] P[11] P[12] P[13] P[14] P[15] P[16] P[17] P[18] P[19] P[20] P[21] P[22] P[23] P[24] P[25] P[26] P[27] P[28] P[29] P[30] P[31] P[32]

$t_{RJ}$ $A_{RM}[4]$-$A_{RM}[0]$
$A_{RM}[4]$-$A_{RM}[0]$

Hi-Z
$E_{FLG}$
$A_{RS}[4]$-$A_{RS}[0]$
$D_{RS}[15]$-$D_{RS}[0]$
$CRC_{RS}[7]$-$CRC_{RS}[0]$
Hi-Z
$E_{FLG}$
$FC_{RS}[1]$-$FC_{RS}[0]$
$A_{RS}[4]$-$A_{RS}[0]$
$FC_{RM}[1]$-$FC_{RM}[0]$

SEMICONDUCTOR DEVICE

CROSS-REFERENCE TO RELATED APPLICATIONS

This application is a continuation under 35 U.S.C. § 120 of PCT/JP2022/047346 filed on Dec. 22, 2022, which is incorporated herein by reference, and which claims priority Japanese Patent Application No. 2022-043469 filed on Mar. 18, 2022. The present application likewise claims priority under 35 U.S.C. § 119 to Japanese Application No. 2022-043469, filed Mar. 18, 2022, the entire content of which is also incorporated herein by reference.

TECHNICAL FIELD

The present disclosure relates to semiconductor devices.

BACKGROUND ART

Semiconductor devices which can perform serial communication using an SPI (Serial Peripheral Interface) or the like are widely used.

On the other hand, in a semiconductor device, a function for detecting whether various types of errors have occurred is often provided. When an error is detected, the semiconductor device may transmit a signal related to the error detection to an external device. A dedicated terminal is provided in each of the semiconductor device and the external device, the dedicated terminals are connected with a dedicated wire and thus the signal related to the error detection can be transmitted.

RELATED ART DOCUMENT

Patent Document

Patent Document 1: International Publication No. WO2019/065395

BRIEF DESCRIPTION OF DRAWINGS

FIG. 6 is a timing chart of the SPI communication in a write mode in the embodiment of the present disclosure.

FIG. 7 is a diagram showing a relationship between an error flag and an error flag signal in the embodiment of the present disclosure.

FIG. 8 is a timing chart of the SPI communication in the write mode in the embodiment of the present disclosure.

FIG. 9 is a timing chart of the SPI communication in a read mode in the embodiment of the present disclosure.

DESCRIPTION OF EMBODIMENTS

Figure 1:
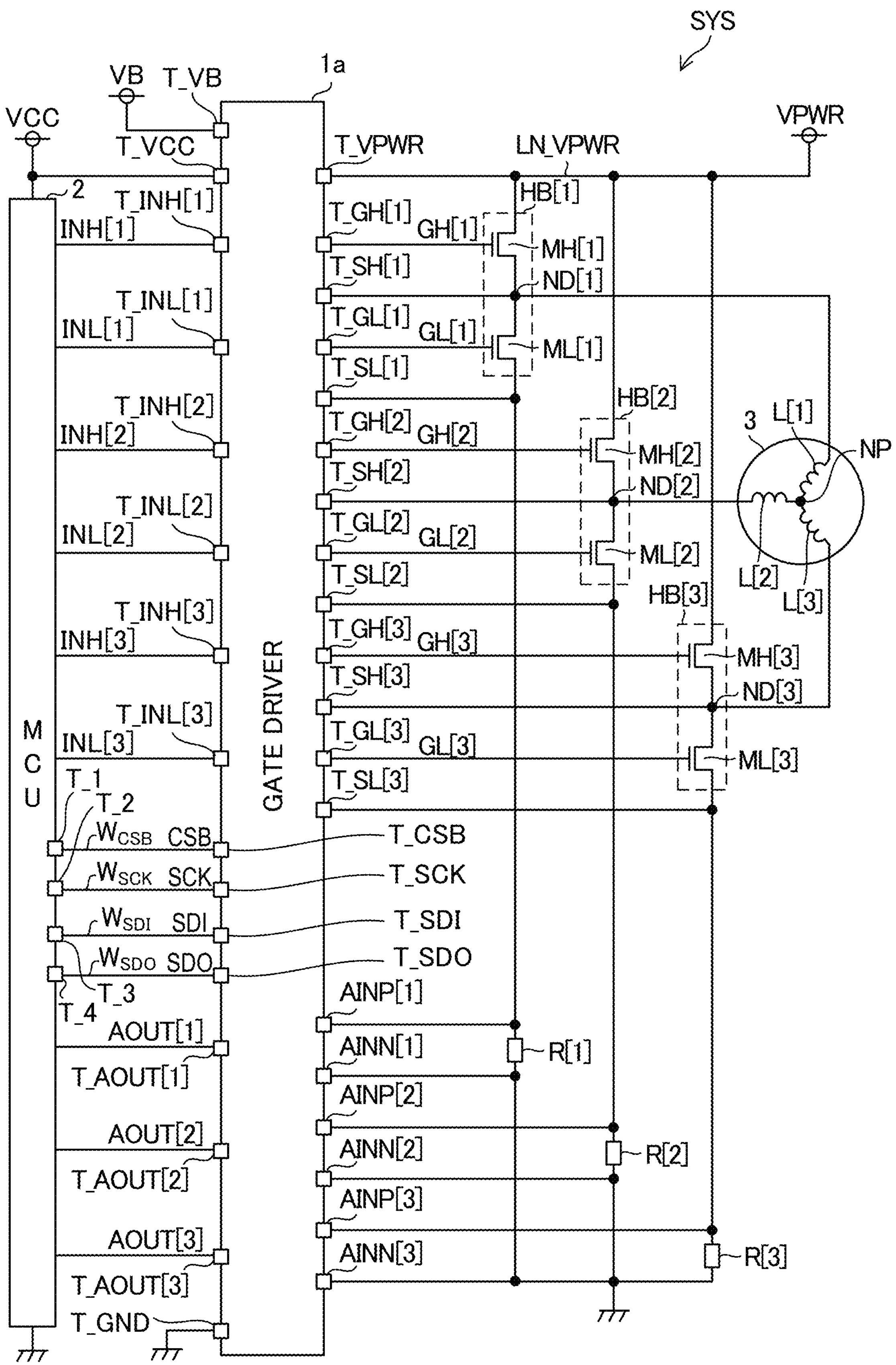
FIG. 1 is an overall configuration diagram of a system in an embodiment of the present disclosure.

Examples of an embodiment of the present disclosure will be specifically described below with reference to drawings. In the referenced drawings, the same parts are identified with the same symbols, and repeated description of the same parts is omitted in principle. In the present specification, for the sake of simplicity of description, by providing signs or symbols for information, signals, physical quantities, elements, parts or the like the names of the information, the signals, the physical quantities, the elements, the parts or the like corresponding to the signs or symbols may be omitted or described in short.

A description will first be given of some terms used in the embodiment of the present disclosure. A line refers to a wire through which an electrical signal is transmitted or applied. A ground refers to a reference conductor having a reference potential of 0V (zero volts) or refers to the potential of 0V itself. The reference conductor may be formed using a conductor such as a metal. The potential of 0V may be referred to as a ground potential. In the embodiment of the present disclosure, a voltage which is indicated without any particular reference is a potential (electric potential) with respect to the ground.

A level refers to the level of a potential (electric potential), and the high level of a signal or a voltage which is arbitrarily noted has a potential higher than the low level thereof. That the signal or the voltage which is arbitrarily noted is high-level means that the level of the signal or the voltage is high-level to be exact, and that the signal or the voltage which is arbitrarily noted is low-level means that the level of the signal or the voltage is low-level to be exact. The level of a signal may be expressed by a signal level, and the level of a voltage may be expressed by a voltage level.

In the signal or the voltage which is arbitrarily noted, switching from low-level to high-level is referred to as up edge, and timing for switching from low-level to high-level is referred to as up edge timing. The up edge may be replaced with rising edge. Likewise, in the signal or the voltage which is arbitrarily noted, switching from high-level to low-level is referred to as down edge, and timing for switching from high-level to low-level is referred to as down edge timing. The down edge may be replaced with falling edge.

For any transistor configured as a FET (field effect transistor), which can be a MOSFET, an on state refers to a state in which electrical continuity is provided between the drain and the source of the transistor, and an off state refers to a state (cut-off state) in which electrical continuity is not provided between the drain and the source of the transistor. The same is true for transistors which are not classified as FETs. Unless otherwise specified, MOSFETs are understood to be enhancement-type MOSFETs. The MOSFET is an abbreviation for "metal-oxide-semiconductor field-effect transistor". Unless otherwise specified, the back gate of any MOSFET may be considered to be short-circuited to the source. In the following description, the on and off states of any transistor may be simply expressed as on and off. For any transistor, switching from the off state to the on state is referred to as "turning on", and switching from the on state to the off state is referred to as "turning off".

Unless otherwise specified, a connection between a plurality of parts which form a circuit such as a circuit element, a wire (line) and a node may be understood to refer to an electrical connection.

FIG. 1 shows an overall configuration diagram of a system SYS in the embodiment of the present disclosure. The system SYS can be referred to as a motor drive system. The system SYS includes a gate driver 1, a MCU (Micro Controller Unit) 2 and a motor 3.

The motor 3 is a three-phase brushless direct-current motor which includes coils L[1] to L[3] for three phases. The motor 3 includes a stator and a rotor having a permanent magnet, and in the stator, the coils L[1] to L[3] are provided. In the configuration example of the present embodiment, the coils L[1] to L[3] are star-connected. The coils L[1], L[2] and L[3] are the coils of the first phase, the second phase and the third phase, respectively. The first phase, the second phase and the third phase correspond to a U phase, a V phase and a W phase, respectively.

In the system SYS, half-bridge circuits HB[1] to HB[3] for the three phases and sense resistors R[1] to R[3] for the three phases are provided.

The half-bridge circuits HB[1] to HB[3] are provided between a power supply line LN_VPWR to which a power supply voltage VPWR is applied and a ground. The power supply voltage VPWR is a predetermined positive direct-current voltage. Each of the half-bridge circuits HB[1] to HB[3] is formed with a high-side transistor and a low-side transistor connected in series to each other. Each of the transistors in the half-bridge circuits HB[1] to HB[3] is formed as an N-channel MOSFET. A high-side transistor in a half-bridge circuit HB[i] is referred to as a high-side transistor MH[i] or is simply referred to as a transistor MH[i]. A low-side transistor in the half-bridge circuit HB[i] is referred to as a low-side transistor ML[i] or is simply referred to as a transistor ML[i]. Here, i represents an arbitrary integer. The transistor MH[i] or ML[i] is also referred to as a power transistor.

The drains of transistors MH[1] to MH[3] are connected to the power supply line LN_VPWR, and receive the supply of the power supply voltage VPWR. For the arbitrary integer i, the source of the high-side transistor MH[i] and the drain of the low-side transistor ML[i] are commonly connected to a node ND[i]. For the arbitrary integer i, the source of the low-side transistor ML[i] is connected to the ground via a sense resistor R[i].

The nodes ND[1], ND[2] and ND[3] are connected to one end of the coil L[1], one end of the coil L[2] and one end of the coil L[3], respectively. The other ends of the coils L[1] to L[3] are commonly connected to each other at a neutral point NP.

Figure 2:
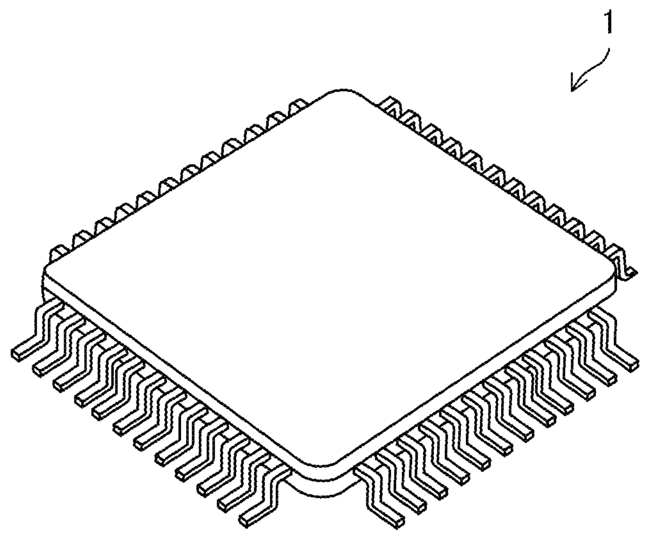
FIG. 2 is an external perspective view of a gate driver according to the embodiment of the present disclosure.

FIG. 2 is an external perspective view of the gate driver 1. The gate driver 1 is an example of a semiconductor device, and is an electronic component which includes a semiconductor chip that includes a semiconductor integrated circuit formed on a semiconductor substrate, a housing (package) that stores the semiconductor chip and a plurality of external terminals that are exposed to the outside of the gate driver 1 from the housing. The semiconductor chip is sealed into the housing (package) formed of resin, and thus the gate driver 1 is formed. The number of external terminals of the gate driver 1 and the type of the housing of the gate driver 1 shown in FIG. 2 are merely examples, and they can be designed arbitrarily.

A part of the external terminals provided in the gate driver 1 are shown in FIG. 1. The external terminals provided in the gate driver 1 include an external terminal T_VPWR, external terminals T_GH[1] to T_GH[3], external terminals T_GL[1] to T_GL[3], external terminals T_SH[1] to T_SH[3], external terminals T_SL[1] to T_SL[3], external terminals AINP[1] to AINP[3], external terminals AINN[1] to AINN[3], an external terminal T_VB, an external terminal T_VCC, external terminals T_INH[1] to T_INH[3], external terminals T_INL[1] to T_INL[3], an external terminal T_CSB, an external terminal T_SCK, an external terminal T_SDI, an external terminal T_SDO, external terminals T_AOUT[1] to T_AOUT[3] and an external terminal T_GND. Although external terminals other than those described above are provided in the gate driver 1, the external terminals shown in FIG. 1 will be described.

The external terminal T_VPWR is a power supply input terminal which is connected to the power supply line LN_VPWR and receives the supply of the power supply voltage VPWR.

The external terminals T_GH[1] to T_GH[3] and the external terminals T_GL[1] to T_GL[3] are gate signal output terminals. The gate signal output terminals T_GH[1] to T_GH[3] are respectively connected to the gates of the high-side transistors MH[1] to MH[3]. The gate signal output terminals T_GL[1] to T_GL[3] are respectively connected to the gates of low-side transistors ML[1] to ML[3]. For any transistor, a signal applied to the gate is referred to as a gate signal. For the arbitrary integer i, the gate signal of the high-side transistor MH[i] is represented by a sign "GH[i]", and the gate signal of the low-side transistor ML[i] is represented by a sign "GL[i]".

The external terminals T_SH[1] to T_SH[3] and the external terminals T_SL[1] to T_SL[3] are source connection terminals. The source connection terminals T_SH[1] to T_SH[3] are respectively connected to the sources of the high-side transistors MH[1] to MH[3]. The source connection terminals T_SL[1] to T_SL[3] are respectively connected to the sources of the low-side transistors ML[1] to ML[3].

The external terminals AINP[1] to AINP[3] and the external terminals AINN[1] to AINN[3] are current detection terminals. For the arbitrary integer i, between current detection terminals AINP[i] and AINN[i], a voltage drop generated in the sense resistor R[i] is applied. For the arbitrary integer i, a source connection terminal T_SL[i] and an external terminal AINP[i] can be set to a common terminal.

The external terminals T_VB and T_VCC are power supply input terminals. A predetermined power supply voltage VB is supplied from an unillustrated voltage source to the external terminal T_VB, and a predetermined power supply voltage VCC is supplied to the external terminal T_VCC. Both the power supply voltages VB and VCC are positive direct-current voltages. The circuits in the gate driver 1 are driven based on the power supply voltage VB, VCC or VPWR.

The external terminals T_INH[1] to T_INH[3] and the external terminals T_INL[1] to T_INL[3] are control input terminals. The MCU 2 is connected to the control input terminals T_INH[1] to T_INH[3] and the control input terminals T_INL[1] to T_INL[3]. The MCU 2 can respectively drive control signals INH[1] to INH[3] and INL[1] to INL[3] to the control input terminals T_INH[1] to T_INH[3] and T_INL[1] to T_INL[3].

A communication terminal group is formed by the external terminals T_CSB, T_SCK, T_SDI and T_SDO. The external terminals T_CSB, T_SCK, T_SDI and T_SDO are a selection input terminal (chip select terminal), a clock input terminal, a data input terminal and a data output terminal, respectively. The MCU 2 includes terminals T_1 to T_4, and the terminals T_1, T_2, T_3 and T_4 are connected via corresponding wires to the external terminals T_CSB, T_SCK, T_SDI and T_SDO, respectively. The wire which connects between the terminals T_1 and T_CSB is a wire $W_{CSB}$. The wire which connects between the terminals T_2 and T_SCK is a wire $W_{SCK}$. The wire which connects between the terminals T_3 and T_SDI is a wire $W_{SDI}$. The wire which connects between the terminals T_4 and T_SDO is a wire $W_{SDO}$. The gate driver 1 and the MCU 2 can perform two-way communication with the communication terminal group (that is, the terminals T_CSB, T_SCK, T_SDI and T_SDO) in the gate driver 1 through the terminals T_1 to T_4. The two-way communication here is serial communication using an SPI (Serial Peripheral Interface). In the following description, the serial communication using the SPI is referred to as SPI communication. Signals which are applied to the wires $W_{CSB}$, $W_{SCK}$, $W_{SDI}$ and $W_{SDO}$ are represented by signs "CSB", "SCK", "SDI" and "SDO".

The external terminals T_AOUT[1] to T_AOUT[3] are current detection output terminals. The MCU 2 is connected to the current detection output terminals T_AOUT[1] to T_AOUT[3]. For the arbitrary integer i, the gate driver 1 outputs a current detection signal AOUT[i] corresponding to a voltage between the current detection terminals AINP[i] and AINN[i] from a current detection output terminal T_AOUT[i], and provides it to the MCU 2. The current detection signal AOUT[i] indicates the result of detection of a current flowing through a coil L[i]. The external terminal T_GND is a ground terminal and is connected to the ground.

Various circuit elements which are not shown in FIG. 1 may be provided in the system SYS. For example, a switch may be provided between the node ND[i] and the coil L[i]. For example, a resistive element, a capacitive element or the like may be provided between a gate terminal T_GH[i] and a source terminal T_SH[i]. The same is true between a gate terminal T_GL[i] and a source terminal T_SL[i].

The MCU 2 receives the supply of the power supply voltage VCC to be driven with reference to the ground potential based on the power supply voltage VCC. The MCU 2 can generate drive control signals INH[1] to INH[3] and INL[1] to INL[3] based on current detection signals AOUT[1] to AOUT[3], and supply the drive control signals to the gate driver 1. The gate driver I can supply gate signals GH[1] to GH[3] based on the drive control signals INH[1] to INH[3] to the gates of the transistors MH[1] to MH[3], and supply gate signals GL[1] to GL[3] based on the drive control signals INL[1] to INL[3] to the gates of the transistors ML[1] to ML[3]. In this way, the states (on or off states) of the transistors MH[1] to MH[3] and ML[1] to ML[3] are controlled, and consequently, a current is supplied to the coils L[1] to L[3] through the half-bridge circuits HB[1] to HB[3] to drive the motor 3. Although the gate signal GH[i] for turning on the transistor MH[i] has a potential higher than the power voltage VPWR, the voltage higher than the power voltage VPWR may be generated based on the power voltage VPWR with a known step-up circuit in the gate driver 1 or outside the gate driver 1.

Figure 3:
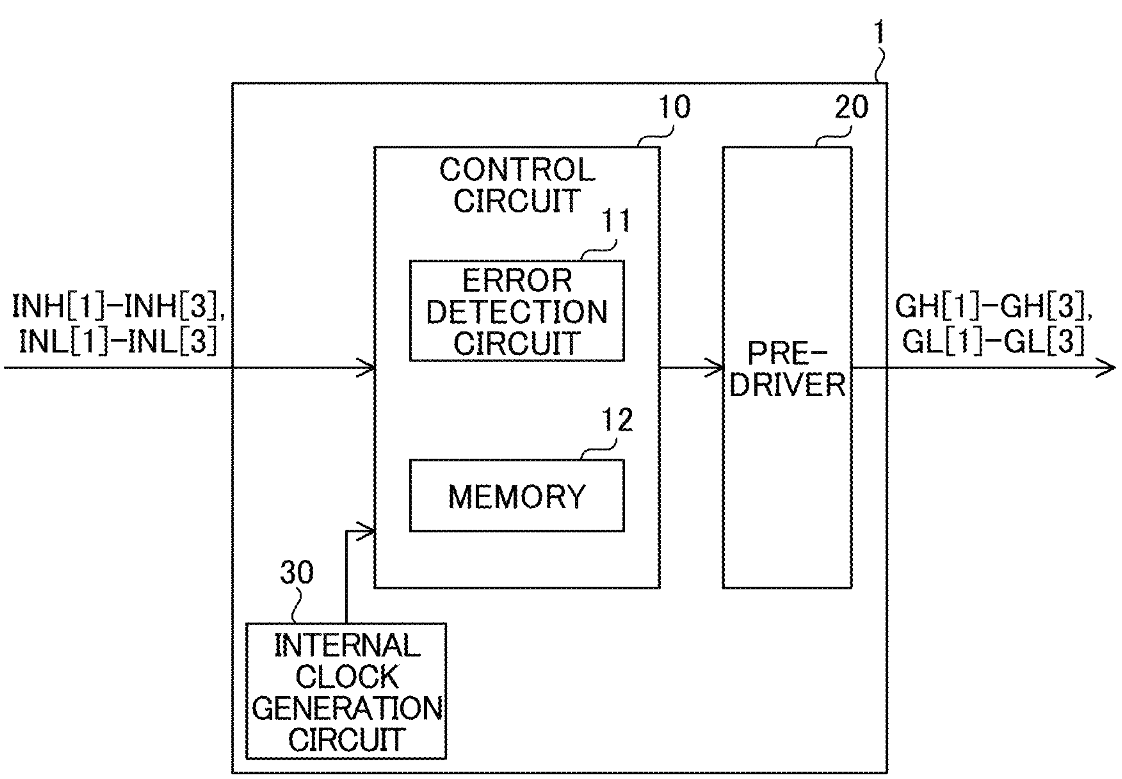
FIG. 3 is a schematic internal block diagram of the gate driver according to the embodiment of the present disclosure.

FIG. 3 shows a schematic internal block diagram of the gate driver 1. In the gate driver 1, a control circuit 10, a pre-driver 20 and an internal clock generation circuit 30 are provided. Although in addition to those described above, various circuits (such as an internal power supply circuit and an amplification circuit) are provided in the gate driver 1, the parts represented by symbols 10, 20 and 30 will be described here.

The control circuit 10 generates gate control signals which are the source of the gate signals GH[1] to GH[3] and GL[1] to GL[3] based on drive control signals INH[1] to INH[3] and INL[1] to INL[3], and provides the generated gate control signals to the pre-driver 20. The pre-driver 20 supplies, based on the gate control signals, the gate signals GH[1] to GH[3] and GL[1] to GL[3] to the gates of the power transistors MH[1] to MH[3] and ML[1] to ML[3]. The internal clock generation circuit 30 generates an internal clock signal which is a rectangular wave signal having a predetermined frequency. The control circuit 10 is operated in synchronization with the internal clock signal.

In the control circuit 10, an error detection circuit 11 and a memory 12 are provided.

The error detection circuit 11 detects whether a plurality of types of errors have occurred. Specifically, whether errors have occurred may be understood to be whether the occurrence of errors is caused. In the following description, in order to give a specific description, the plurality of types of errors are referred to as first to nth target errors. Here, n is an integer of 2 or more. In the present specification, the error and the abnormality are synonymous with each other, and they can be replaced with each other. The first to nth target errors will be illustrated.

For example, the error detection circuit 11 is connected to a temperature detection circuit (not shown) which outputs a signal corresponding to a temperature (hereinafter referred to as a target temperature) in the predetermined position of the gate driver 1, and monitors the target temperature based on the output signal of the temperature detection circuit. Then, when the target temperature exceeds a predetermined warning temperature, the error detection circuit 11 detects that a TW error (thermal warning error) has occurred. When the target temperature exceeds a predetermined shut down temperature higher than the warning temperature, the error detection circuit 11 detects that a TSD error (thermal shut down error) has occurred. The TW error and the TSD error are included in the first to nth target errors.

For example, the error detection circuit 11 compares the power supply voltage VB with a predetermined upper limit voltage $VB_{HLIM}$ and a predetermined lower limit voltage $VB_{LLIM}$, and when the power supply voltage VB exceeds the upper limit voltage $VB_{HLIM}$, the error detection circuit 11 detects that a first power supply error has occurred whereas when the power supply voltage VB drops below the lower limit voltage $VB_{LLIM}$, the error detection circuit 11 detects that a second power supply error has occurred. Here, "$VB_{HLIM}>VB_{LLIM}>0$" is established. Likewise, for example, the error detection circuit 11 compares the power supply voltage VCC with a predetermined upper limit voltage $VCC_{HLIM}$ and a predetermined lower limit voltage $VCC_{LLIM}$, and when the power supply voltage VCC exceeds the upper limit voltage $VCC_{HLIM}$, the error detection circuit 11 detects that a third power supply error has occurred whereas when the power supply voltage VCC drops below the lower limit voltage $VCC_{LLIM}$, the error detection circuit 11 detects that a fourth power supply error has occurred. Here, "$VCC_{HLIM}>VCC_{LLIM}>0$" is established. The first to fourth power supply errors are included in the first to nth target errors.

For example, the error detection circuit 11 monitors a voltage between the terminals AINP[i] and AINN[i], and when the magnitude of the voltage between the terminals AINP[i] and AINN[i] exceeds a current monitoring upper limit threshold value which is set, the error detection circuit 11 detects that a current error has occurred. The current error is included in the first to nth target errors. The current error indicates that a current flowing through the sense resistor R[i] is excessively high. Whether the current error has occurred is detected for each of a voltage between the terminals AINP[1] and AINN[1], a voltage between the terminals AINP[2] and AINN[2] and a voltage between the terminals AINP[3] and AINN[3].

For example, the error detection circuit 11 can detect, based on a voltage between the drain and the source of each of the power transistors and a voltage between both terminals of each of the sense resistors, whether an open error where an open state is caused between the drain and the source of any of the power transistors has occurred, and can detect whether a short-circuit error where a short-circuit occurs between the drain and the source of any of the power transistors has occurred. The open error and the short-circuit error are included in the first to nth target errors. Whether the open error has occurred and whether the short-circuit error has occurred may be detected for each of the power transistors.

For example, the error detection circuit 11 can detect whether a communication error has occurred, and the communication error is included in the first to nth target errors. The details of the communication error will be described later. Various types of errors can also be included in the first to nth target errors.

Figure 4:
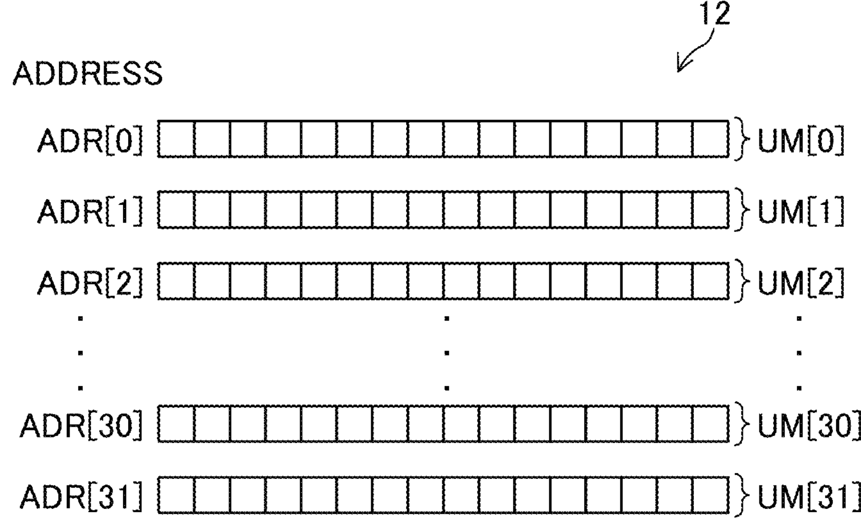
FIG. 4 is a diagram showing the configuration of a memory in the gate driver according to the embodiment of the present disclosure.

The memory 12 is a volatile memory or a non-volatile memory which has a predetermined storage capacity. With reference to FIG. 4, the memory 12 includes a total of 32 unit storage regions UM[0] to UM[31]. In the memory 12, a unique address is assigned to each of the unit storage regions. In the following description, an address indicates an address which is assigned to any one of the unit storage regions. Here, each of the unit storage regions is assumed to be a storage region of 16 bits. Each of the unit storage regions may be a storage region which is classified as a register. An address which is assigned to a unit storage region UM[i] is represented by a sign "ADR[i]".

Various types of data are stored in the unit storage regions UM[0] to UM[31]. In the present specification, the storage of data and the retention of data may be considered to be synonymous with each other. Based on a signal received from the MCU 2 in the SPI communication, the gate driver 1 can perform the write operation or the read operation. In the write operation, the control circuit 10 writes data specified by the signal from the MCU 2 to an address specified by the signal from the MCU 2. In the read operation, the control circuit 10 reads storage data in the address specified by the signal from the MCU 2, and transmits the storage data to the MCU 2. In the following description, that for arbitrary noted data, the noted data is stored in the memory 12 means that the noted data is stored in any one of the unit storage regions UM[0] to UM[31]. When the noted data is formed with a plurality of bits, the noted data may be stored over two or more unit storage regions.

For example, source current setting data and sink current setting data are stored in the memory 12. Each of the source current setting data and the sink current setting data is formed with data of a plurality of bits. By the write operation, the control circuit 10 can store the data specified by the MCU 2 in the memory 12 as the source current setting data and the sink current setting data.

As the source current setting data, first source current setting data for the power transistors MH[1] to MH[3] and second source current setting data for the power transistors ML[1] to ML[3] are provided. The first source current setting data specifies the magnitude of a current output from the terminal T_GH[i] when the potential of the gate signal GH[i] is increased in order to turn on the power transistor MH[i]. The same is true for the second source current setting data.

As the sink current setting data, first sink current setting data for the power transistors MH[1] to MH[3] and second sink current setting data for the power transistors ML[1] to ML[3] are provided. The first sink current setting data specifies the magnitude of a current drawn from the gate of the power transistor MH[i] to the terminal T_GH[i] when the potential of the gate signal GH[i] is decreased in order to turn off the power transistors MH[i]. The same is true for the second sink current setting data.

For example, dead time setting data is stored in the memory 12. The dead time setting data is formed with data of a plurality of bits. By the write operation, the control circuit 10 can store the data specified by the MCU 2 in the memory 12 as the dead time setting data. The dead time setting data includes dead time length setting data and dead time method setting data.

Although the power transistors MH[i] and ML[i] are alternately turned on, when a state where the power transistor MH[i] is on and the power transistor ML[i] is off is switched to a state where the power transistor MH[i] is off and the power transistor ML[i] is on or when the latter state is switched to the former state, a both-off period during which both the power transistors MH[i] and ML[i] are off is provided. The time length of the both-off period is referred to as a dead time. The length of the dead time is specified by the dead time length setting data. In the gate driver 1, as a method for setting the dead time, any one of a plurality of methods can be selectively adopted, and the method for setting the dead time which is actually adopted is specified by the dead time method setting data.

For example, error data indicating whether the first to nth target errors have been detected is stored in the memory 12 for each of the target errors. This will be described with the assumption that the first bit in a unit storage region UM[j] is assigned to the ith target error. In a state where the ith target error is not detected at all, in the first bit of the unit storage region UM[j], the initial value of "0" is stored. When the error detection circuit 11 detects that the ith target error has occurred, the control circuit 10 stores, as data indicating that the ith target error has been detected (specifically, indicating that the occurrence of the ith target error has been detected), a value of "1" is stored in the first bit of the unit storage region UM[j].

Moreover, various types of setting data and the like can be stored in the memory 12. The MCU 2 can store necessary data in the memory 12 through the write operation, and can acquire desired data in the memory 12 through the read operation.

In the control circuit 10, an access mode for the memory 12 is set to a write mode or a read mode. When the access mode for the memory 12 is set to the write mode, the control circuit 10 performs the write operation based on the signal received from the MCU 2 in the SPI communication. When the access mode for the memory 12 is set to the read mode, the control circuit 10 performs the read operation based on the signal received from the MCU 2 in the SPI communication. The control circuit 10 can receive, with the SPI communication, a write mode command or a read mode command from the MCU 2. After the control circuit 10 receives the write mode command with the SPI communication, the control circuit 10 is operated in the write mode, and thereafter, when the control circuit 10 receives the read mode command with the SPI communication, the control circuit 10 switches the access mode for the memory 12 to the read mode to be operated in the read mode. Likewise, after the control circuit 10 receives the read mode command with the SPI communication, the control circuit 10 is operated in the read mode, and thereafter, when the control circuit 10 receives the write mode command with the SPI communication, the control circuit 10 switches the access mode for the memory 12 to the write mode to be operated in the write mode.

Figure 5:
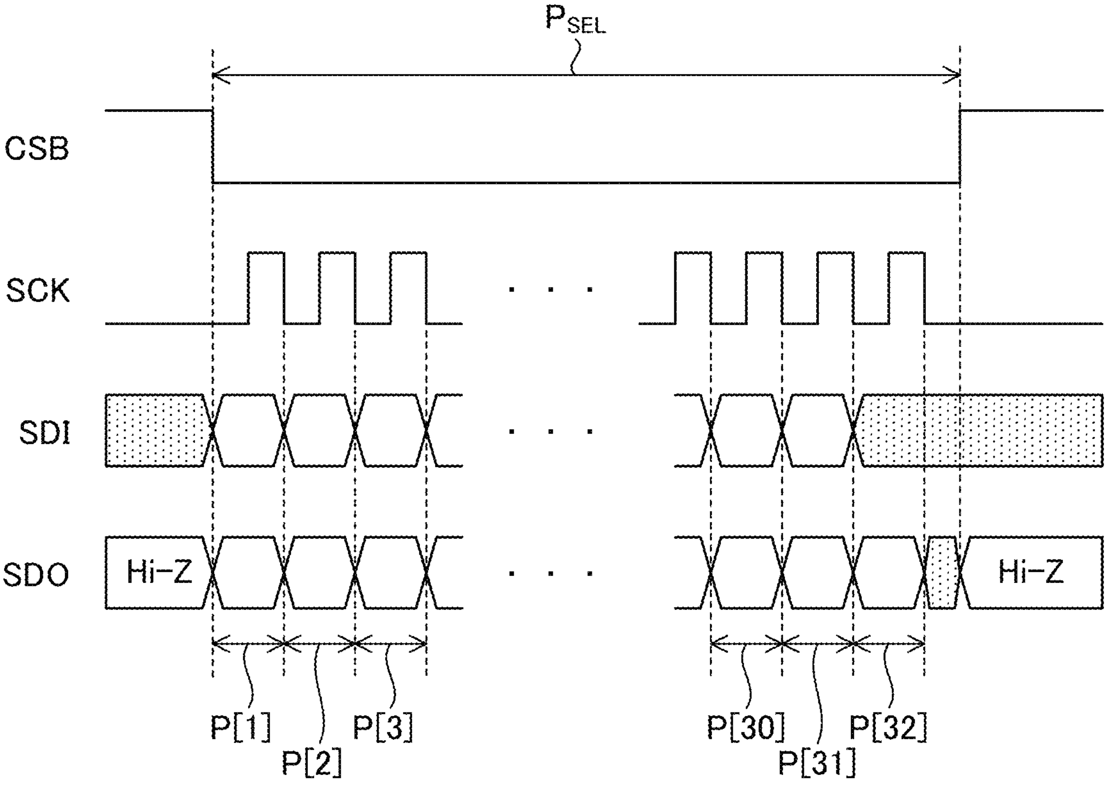
FIG. 5 is a diagram showing a relationship of a plurality of signals related to SPI communication in the embodiment of the present disclosure.

With reference to FIG. 5, a relationship between some signals and some periods related to the SPI communication is shown. In the SPI communication, the MCU 2 is operated as a master device, and the gate driver 1 is operated as a slave device. The signals CSB, SCK and SDI are signals which are output by the MCU 2 from the terminals T_1, T_2 and T_3, and the gate driver 1 receives the signals at the terminals T_CSB, T_SCK and T_SDI. The signal SDO is a signal which is output by the gate driver 1 from the signal T_SDO, and the MCU 2 receives the signal at the terminal T_4. However, during a non-selection period which will be described later, the gate driver 1 may output the signal SDO according to the setting or may stop the output of the signal SDO. The output of a signal and the transmission of a signal are synonymous with each other in the SPI communication. In the SPI communication, a signal output by the gate driver 1 and a signal received by the gate driver 1 may be understood to be a signal output by the control circuit 10 and a signal received by the control circuit 10. The signals CSB, SCK, SDI and SDO are binary signals which can take a high or low signal level, and in these binary signals, the high level has the potential of the power supply voltage VCC, and the low level has the potential of the ground.

A signal CSB is a selection signal. The MCU 2 outputs a high-level or low-level signal CSB to the terminal T_CSB in the gate driver 1. When the signal CSB has a predetermined active level, the gate driver 1 is selected as the communication partner of the MCU 2, and thus the SPI communication between the gate driver 1 and the MCU 2 is performed. In the present embodiment, the active level of the signal CSB is assumed to be low-level. However, a variation in which the active level is high-level may be adopted. A period during which the signal CSB has the active level (here, a low level) is referred to as a selection period and is represented by a sign "$P_{SEL}$" as necessary. A period different from the selection period $P_{SEL}$, that is, a period during which the signal CSB has a high level is referred to as the non-selection period.

The signal SCK is a clock signal. In the present embodiment, during the non-selection period, the signal SCK is assumed to be fixed to be low-level. However, during the non-selection period, a communication method in which the signal SCK is fixed to be high-level may be adopted. During the selection period $P_{SEL}$, the MCU 2 outputs, as the clock signal SCK, a rectangular wave signal having a predetermined frequency to the terminal T_SCK in the gate driver 1. After the selection period $P_{SEL}$ is started, the up edge and the down edge are alternately generated in the clock signal SCK.

A period after the start timing of the selection period $P_{SEL}$ until the first down edge timing of the clock signal SCK is represented by a sign "P[1]". During the selection period $P_{SEL}$, a period after the jth down edge timing of the clock signal SCK until the (j+1)th down edge timing of the clock signal SCK is represented by a sign "P[j+1]". Here, j represents any natural number. A period P[j] is referred to as a unit clock period. Each unit clock period has the length of one cycle of the clock signal SCK. In the present embodiment, unless otherwise specified, it is assumed that the selection period $P_{SEL}$ includes unit clock periods P[1] to P[32], and after the completion of the unit clock period P[32], the up edge is generated in the signal CSB with the clock signal SCK maintained low-level. In the following description, the cycle of the clock signal SCK can be referred to as a clock cycle.

The signal SDI can be an input data signal for the gate driver 1. The MCU 2 can output, during the unit clock periods P[1] to P[31], a signal indicating significant data to the data input terminal T_SDI in the gate driver 1 as the input data signal SDI. The signal SDI during the non-selection period is an invalid signal for the gate driver 1, and during the selection period $P_{SEL}$, the signal SDI after the unit clock period P[32] is also an invalid signal for the gate driver 1. In FIG. 5, dot hatching indicates that the corresponding signals and data are invalid (the same is true for FIGS. 6, 8 and 9 described below).

The signal SDO can be an output data signal from the gate driver 1. The gate driver 1 can output, during the unit clock periods P[1] to P[32], the signal SDO indicating significant data from the terminal T_SDO to the MCU 2. During a period after the completion of the unit clock period P[32] until the up edge is generated in the signal CSB, output data from the terminal T_SDO is invalid data. The control circuit 10 uses an open-drain MOSFET, a three-state buffer or the like to be able to set the terminal T_SDO to a signal output state or a Hi-Z state. Only in the signal output state, valid data (valid signal) is output from the terminal T_SDO. When the terminal T_SDO is in the Hi-Z state, the output of a signal from the terminal T_SDO performed by the gate driver 1 is stopped. In the terminal T_SDO in the Hi-Z state, the input impedance of the terminal T_SDO relative to the wire $W_{SDO}$ is sufficiently high, and a current flowing through the terminal T_SDO is substantially zero. Here, it is assumed that during the non-selection period, the terminal T_SDO is kept in the Hi-Z state.

It is assumed that a value of "1" is assigned to a high-level signal SDI, and a value of "0" is assigned to a low-level signal SDI. It is assumed that except an error flag output period which will be described later, a value of "1" is assigned to a high-level signal SDO, and a value of "0" is assigned to a low-level signal SDO. The MCU 2 makes the signal SDI high or low during each of a plurality of unit clock periods in the selection period $P_{SEL}$, and thereby transmits one bit of data to the gate driver 1. The control circuit 10 captures, as a reception value, the value of the signal SDI in the up edge timing of the signal SCK during each of a plurality of unit clock periods in the selection period $P_{SEL}$.

The operation of the SPI communication in the write mode and the operation of the SPI communication in the read mode will be separately described below.

FIG. 6 shows a timing chart in the write mode. In the write mode, data is written in the memory 12 for each word. Here, one word is the storage capacity of the unit storage region, and is therefore assumed to be 16 bits. In the write mode, during each selection period, one packet of data is transmitted from the MCU 2 to the gate driver 1, and during each selection period, the control circuit 10 writes one word of data in the memory 12 based on received data. In the write mode, one word of data to be written in the memory 12 is included in one packet of data. Each selection period includes the unit clock periods P[1] to P[32] as described above. The MCU 2 and the gate driver 1 can transmit or receive one bit of data in synchronization with the clock signal SCK during each unit clock period.

In the write mode, one packet of data transmitted from the MCU 2 to the gate driver 1 includes data $FC_{WM}$[1] to $FC_{WM}$[0], data $A_{WM}$[4] to $A_{WM}$[0], data $D_{WM}$[15] to $D_{WM}$[0] and data $CRC_{WM}$[7] to $CRC_{WM}$[0].

The MCU 2 includes a frame counter. The frame counter cyclically counts integer values from 0 to 3. Specifically, the initial value of the count value of the frame counter is set to zero, and in the write mode, the MCU 2 adds 1 to the count value of its own frame counter each time the transmission of one packet of data is completed. When the sum exceeds 3, MCU2 initializes the count value of its own frame counter to zero. In the write mode, the count value of the frame counter is indicated by two bits of data $FC_{WM}$[1] to $FC_{WM}$[0].

The data $D_{WM}$[15] to $D_{WM}$[0] is 16 bits of data indicating write data to be written to a write target address. The data $A_{WM}$[4] to $A_{WM}$[0] is 5 bits of data indicating the write target address. In other words, any one of addresses ADR[0] to ADR[31] (see FIG. 4) is specified as the write target address by the data $A_{WM}$[4] to $A_{WM}$[0]. If the value of 5 bits of data indicated by the data $A_{WM}$[4] to $A_{WM}$[0] is "q", then an address ADR[q] is the write target address (here, q is an integer which is equal to or greater than 0 and equal to or less than 31).

The data $CRC_{WM}$[7] to $CRC_{WM}$[0] is 8 bits of data which is calculated by the MCU 2 and indicates an error detection code. In the present embodiment, the error detection code resulting from a cyclic redundancy check is used. The MCU 2 derives the 8-bit error detection code according to a predetermined code calculation formula based on the data $FC_{WM}$[1] to $FC_{WM}$[0], the data $A_{WM}$[4] to $A_{WM}$[0] and the data $D_{WM}$[15] to $D_{WM}$[0] which are transmitted by itself, and transmits the derived 8-bit error detection code to the gate driver 1 as the data $CRC_{WM}$[7] to $CRC_{WM}$[0].

During the unit clock periods P[1] and P[2], the data $FC_{WM}$[1] and $FC_{WM}$[0] is transmitted from the MCU 2, and is received at the terminal T_SDI in the gate driver 1, respectively. During the unit clock periods P[3] to P[7], the data $A_{WM}$[4] to $A_{WM}$[0] is transmitted from the MCU 2, and is received at the terminal T_SDI in the gate driver 1, respectively. During the unit clock periods P[8] to P[23], the data $D_{WM}$[15] to $D_{WM}$[0] is transmitted from the MCU 2, and is received at the terminal T_SDI in the gate driver 1, respectively. During the unit clock periods P[24] to P[31], the data $CRC_{WM}$[7] to $CRC_{WM}$[0] is transmitted from the MCU 2, and is received at the terminal T_SDI in the gate driver 1, respectively.

A signal indicating the data $FC_{WM}$[1] and $FC_{WM}$[0] can be referred to as a frame counter signal. A signal indicating the data $A_{WM}$[4] to $A_{WM}$[0] (that is, a signal indicating the write target address) can be referred to as an address signal. A signal indicating the data $D_{WM}$[15] to $D_{WM}$[0] (that is, a signal indicating the write data) can be referred to as a write data signal. A signal indicating the data $CRC_{WM}$[7] to $CRC_{WM}$[0] (that is, a signal indicating the error detection code) can be referred to as an error detection code signal.

The control circuit 10 in the write mode outputs the frame counter signal, the address signal and the write data signal received at the terminal T_SDI from the terminal T_SDO with timing delayed by one clock cycle from the timing of the reception thereof. In order to realize this output, the control circuit 10 in the write mode captures, as the jth reception value, the value of the signal SDI in the up edge timing of the signal SCK during a unit clock period P[j], and outputs data indicating the jth reception value from the terminal T_SDO during a unit clock period P[j+1] (here, j is an integer which is equal to or greater than 1 and equal to or less than 23). The control circuit 10 in the write mode outputs, from the terminal T_SDO, data $FC_{WS}$[1] and $FC_{WS}$[0] during the unit clock periods P[2] and P[3], respectively, outputs data $A_{WS}$[4] to $A_{WS}$[0] during the unit clock periods P[4] to P[8], respectively, and outputs data $D_{WS}$[15] to $D_{WS}$[0] during the unit clock periods P[9] to P[24], respectively. The data $FC_{WS}$[1] and $FC_{WS}$[0] has the first and second reception values, respectively. The data $A_{WS}$[4] to $A_{WS}$[0] has the third to seventh reception values, respectively. The data $D_{WS}$[15] to $D_{WS}$[0] has the eighth to twenty third reception values, respectively. The data $FC_{WS}$[1] to $FC_{WS}$[0] forms a frame counter signal of the same value as the data $FC_{WM}$[1] to $FC_{WM}$[0]. The data $A_{WS}$[4] to $A_{WS}$[0] forms an address signal of the same value as the data $A_{WM}$[4] to $A_{WM}$[0]. The data $D_{WS}$[15] to $D_{WS}$[0] forms a write data signal of the same value as the data $D_{WM}$[15] to $D_{WM}$[0].

The control circuit 10 in the write mode derives an 8-bit error detection code according to the code calculation formula described above based on the data $FC_{WM}$[1] to $FC_{WM}$[0], the data $A_{WM}$[4] to $A_{WM}$[0] and the data $D_{WM}$[15] to $D_{WM}$[0] (that is, the first to twenty third reception values) which are received, and sets the derived 8-bit error detection code to data $CRC_{WS}$[7] to $CRC_{WS}$[0]. Then, the control circuit 10 outputs, from the terminal T_SDO, the data $CRC_{WS}$[7] to $CRC_{WS}$[0] during the unit clock periods P[25] to P[32]. Since the code calculation formulae used in the MCU 2 and the control circuit 10 are the same as each other, when the SPI communication is properly performed, the data $CRC_{WM}$[7] to $CRC_{WM}$[0] matches the data $CRC_{WS}$[7] to $CRC_{WS}$[0].

The MCU 2 checks the data $FC_{WM}$[1] to $FC_{WM}$[0], the data $A_{WM}$[4] to $A_{WM}$[0], the data $D_{WM}$[15] to $D_{WM}$[0] and the data $CRC_{WM}$[7] to $CRC_{WM}$[0] which are output by itself to the gate driver 1 during the selection period of the gate driver 1 against the data $FC_{WS}$[1] to $FC_{WS}$[0], the data $A_{WS}$[4] to $A_{WS}$[0], the data $D_{WS}$[15] to $D_{WS}$[0] and the data $CRC_{WS}$[7] to $CRC_{WS}$[0] which are received from the gate driver 1, and thereby can determine whether the transmission and reception in the SPI communication has been properly performed.

The error detection circuit 11 in the write mode determines (detects), at a predetermined error determination timing $t_{WJ}$ during the selection period, whether a communication error has occurred. The error determination timing $t_{WJ}$ is the up edge timing of the signal SCK during the unit clock period P[32]. In the error determination timing $t_{WJ}$, whether the following first and second communication error conditions are established is determined.

The error detection circuit 11 in the write mode checks the data $CRC_{WM}$[7] to $CRC_{WM}$[0] received against the data $CRC_{WS}$[7] to $CRC_{WS}$[0] derived in the control circuit 10, and when they are different from each other, the error detection circuit 11 determines that the first communication error condition is established. The error detection circuit 11 in the write mode compares the value of the data $FC_{WM}$[1] to $FC_{WM}$[0] received during the current selection period with the value of the data $FC_{WM}$[1] to $FC_{WM}$[0] received during the previous selection period, and when they match each other, the error detection circuit 11 determines that the second communication error condition is established. When at least one of the first and second communication error conditions are established, the error detection circuit 11 determines that a communication error has occurred. When neither of the first and second communication error conditions is established, the error detection circuit 11 determines that no communication error has occurred.

Incidentally, the control circuit 10 holds an error flag $E_{FLG}$ indicating whether a flag correspondence error (specific error) has occurred. The error flag $E_{FLG}$ here is a 1-bit flag having a value of "0" or "1". The error flag $E_{FLG}$ may be a flag stored in any bit in the unit storage regions UM[0] to UM[31] or may be a flag stored in a storage region other than the unit storage regions UM[0] to UM[31].

In the first to nth target errors, m target errors (that is, m types of errors) correspond to the flag correspondence errors. Here, m may be 1 or may be equal to or greater than 2. The m target errors corresponding to the flag correspondence errors may be m types of errors which are previously fixed. The m target errors corresponding to the flag correspondence errors may also be m types of errors which are specified by the MCU 2. In other words, error flag setting data is stored in any of the unit storage regions UM[0] to UM[31], and the error flag setting data is used to specify what target error in the first to nth target errors is caused to correspond to the flag correspondence error. The MCU 2 sets an address where the error flag setting data is stored to the write target address, and then the MCU 2 causes the control circuit 10 to perform the write operation, with the result that it is possible to cause the desired type of error to correspond to the flag correspondence error.

In a case where only one type of target error corresponds to the flag correspondence error (that is, in a case where "m=1"), when the error detection circuit 12 determines that the one type of target error has occurred, the error flag $E_{FLG}$ has a value of "1" whereas when it is not so, the error flag $E_{FLG}$ has a value of "0". In a case where two or more types of target errors correspond to the flag correspondence error (that is, in a case where "m≥2"), in the error detection circuit 12, a logical sum related to the occurrence of two or more types of target errors is assigned to the error flag $E_{FLG}$. In other words, in a case where two or more types of target errors correspond to the flag correspondence errors (that is, in a case where "m≥2"), when the error detection circuit 12 determines that at least one target error corresponding to the flag correspondence error has occurred, the error flag $E_{FLG}$ has a value of "1" whereas when it is not so, the error flag $E_{FLG}$ has a value of "0". As described previously, the error data indicating whether the first to nth target errors have been detected is stored in the memory 12 for each of the target errors. The control circuit 10 can set the value of the error flag $E_{FLG}$ based on the error data for the target error corresponding to the flag correspondence error.

At least the communication error is preferably caused to correspond to the flag correspondence error. For example, the control circuit 10 may constantly cause the communication error to correspond to the flag correspondence error regardless of the error flag setting data described above.

As a special note, the control circuit 10 in the write mode sets the error flag output period in the selection period, and outputs, during the error flag output period, an error flag signal ERRB corresponding to the value of the error flag $E_{FLG}$ from the terminal T_SDO. In the example of FIG. 6, the unit clock period P[1] corresponds to the error flag output period. As shown in FIG. 7, during the error flag output period, when the value of the error flag $E_{FLG}$ is "0", the error flag signal ERRB is high-level whereas when the value of the error flag $E_{FLG}$ is "1", the error flag signal ERRB is low-level. Hence, when the MCU 2 causes the gate driver 1 to perform the write operation, the MCU 2 only turns the signal CSB low to be able to immediately recognize whether the flag correspondence error has occurred.

With reference to FIG. 8 the data $D_{WM}$[15] to $D_{WM}$[0] which is received by the gate driver 1 during a certain selection period $P_{SEL}$_k is referred to as write data WD_k. When it is determined that no communication error has occurred in the SPI communication during the selection period $P_{SEL}$_k, the control circuit 10 performs the write operation for writing the write data WD_k to the write target address indicated by the data $A_{WM}$[4] to $A_{WM}$[0]. The write operation is performed in synchronization with the internal clock signal. For example, the write operation is started with timing at which the up edge is generated a predetermined number of times in the internal clock signal after the error determination timing $t_{WJ}$ during the selection period $P_{SEL}$_k. Hence, the write operation based on the write data WD_k can be started after the completion of the selection period $P_{SEL}$_k. In the example of FIG. 8, the write operation based on the write data WD_k is performed over the non-selection period after the selection period $P_{SEL}$_k and a selection period $P_{SEL}$_k+1 subsequent to the selection period $P_{SEL}$_k. However, the write operation based on the write data WD_k may be started during the selection period $P_{SEL}$_k or may be completed during the selection period $P_{SEL}$_k.

When it is determined that a communication error has occurred in the SPI communication during the selection period $P_{SEL}$_k, the control circuit 10 does not perform the write operation based on the write data WD_k (hence, storage data in the write target address is maintained without being changed). In a case where a communication error corresponds to the flag correspondence error, when it is determined that a communication error has occurred in the SPI communication during the selection period $P_{SEL}$_k, the control circuit 10 outputs, from the terminal T_SDO, a signal of the error flag $E_{FLG}$ of "1" (that is, a low-level error flag signal ERRB) during the error flag output period in the selection period $P_{SEL}$_k+1.

FIG. 9 shows a timing chart in the read mode. In the read mode, data is read from the memory 12 for each word. Specifically, in the read mode, during each selection period, one packet of data is transmitted from the MCU 2 to the gate driver 1, and during each selection period, the control circuit 10 reads one word of data from the memory 12 based on received data, and transmits the one word of data to the MCU 2. Each selection period includes the unit clock periods P[1] to P[32] as described above. The MCU 2 and the gate driver 1 can transmit or receive one bit of data in synchronization with the clock signal SCK during each unit clock period.

In the read mode, one packet of data transmitted from the MCU 2 to the gate driver 1 includes data $FC_{RM}$[1] to $FC_{RM}$[0] and data $A_{RM}$[4] to $A_{RM}$[0].

2 bits of the data $FC_{RM}$[1] to $FC_{RM}$[0] indicates the count value of the above-described frame counter in the read mode. The data $A_{RM}$[4] to $A_{RM}$[0] is 5 bits of data which indicates the read target address. In other words, any one of the addresses ADR[0] to ADR[31] (see FIG. 4) is specified as the read target address by the data $A_{RM}$[4] to $A_{RM}$[0]. If the value of 5 bits of data indicated by the data $A_{RM}$[4] to $A_{RM}$[0] is "q", then an address ADR[q] is the read target address (here, q is an integer which is equal to or greater than 0 and equal to or less than 31).

During the unit clock periods P[1] and P[2], the data $FC_{RM}$[1] and $FC_{RM}$[0] is transmitted from the MCU 2, and is received at the terminal T_SDI in the gate driver 1, respectively. During the unit clock periods P[3] to P[7], the data $A_{RM}$[4] to $A_{RM}$[0] is transmitted from the MCU 2, and is received at the terminal T_SDI in the gate driver 1, respectively.

A signal indicating the data $FC_{RM}$[1] and $FC_{RM}$[0] can be referred to as a frame counter signal. A signal indicating the data $A_{RM}$[4] to $A_{RM}$[0] (that is, a signal indicating the read target address) can be referred to as an address signal.

The control circuit 10 in the read mode outputs, from the terminal T_SDO, the frame counter signal and the address signal received at the terminal T_SDI with timing delayed by one clock cycle from the timing of the reception thereof. In order to realize this output, the control circuit 10 in the read mode captures, as the jth reception value, the value of the signal SDI in the up edge timing of the signal SCK during the unit clock period P[j], and outputs data indicating the jth reception value from the terminal T_SDO during the unit clock period P[j+1] (here, j is an integer which is equal to or greater than 1 and equal to or less than 7). The control circuit 10 in the read mode outputs, from the terminal T_SDO, data $FC_{RS}$[1] and $FC_{RS}$[0] during the unit clock periods P[2] and P[3], respectively, and outputs data $A_{RS}$[4] to $A_{RS}$[0] during the unit clock periods P[4] to P[8], respectively. The data $FC_{RS}$[1] and $FC_{RS}$[0] has the first and second reception values, respectively. The data $A_{RS}$[4] to $A_{RS}$[0] has the third to seventh reception values, respectively. The data $FC_{RS}$[1] to $FC_{RS}$[0] forms a frame counter signal of the same value as the data $FC_{RM}$[1] to $FC_{RM}$[0]. The data $A_{RS}$[4] to $A_{RS}$[0] forms an address signal of the same value as the data $A_{RM}$[4] to $A_{RM}$[0].

The control circuit 10 in the read mode reads storage data in the unit storage region specified by the read target address, and outputs, from the terminal T_SDO, 16 bits of storage data which is read as data $D_{RS}$[15] to $D_{RS}$[0] during the unit clock periods P[9] to P[24]. If the value of 5 bits of data indicated by the data $A_{RM}$[4] to $A_{RM}$[0] is "q", then an address ADR[q] is the read target address (here, q is an integer which is equal to or greater than 0 and equal to or less than 31). The data $D_{RS}$[15] to $D_{RS}$[0] can be collectively referred to as read data, and a signal indicating the read data can be referred to as a read data signal.

The control circuit 10 in the read mode derives an 8-bit error detection code according to the code calculation formula described previously based on the data $D_{RS}$[15] to $D_{RS}$[0], and sets the derived 8-bit error detection code to data $CRC_{RS}$[7] to $CRC_{RS}$[0]. Then, the control circuit 10 outputs, from the terminal T_SDO, the data $CRC_{RS}$[7] to $CRC_{RS}$[0] during the unit clock periods P[25] to P[32].

The MCU 2 derives an 8-bit error detection code according to the code calculation formula described previously based on the data $D_{RS}$[15] to $D_{RS}$[0] received from the gate driver 1. The MCU 2 checks the error detection code derived by itself against the error detection code resulting from the data $CRC_{RS}$[7] to $CRC_{RS}$[0] received from the gate driver 1, and thereby can determine whether the data $D_{RS}$[15] to $D_{RS}$[0] has been properly received. The MCU 2 checks the data $FC_{RM}$[1] to $FC_{RM}$[0] and the data $A_{RM}$[4] to $A_{RM}$[0] which are output by itself to the gate driver 1 during the selection period of the gate driver 1 against the data $FC_{RS}$[1] to $FC_{RS}$[0] and the data $A_{RS}$[4] to $A_{RS}$[0] which are received from the gate driver 1, and thereby can determine whether the transmission and reception in the SPI communication has been properly performed.

The error detection circuit 11 in the read mode determines (detects) whether a communication error has occurred with predetermined error determination timing $t_{RJ}$ during the selection period. The error determination timing $t_{RJ}$ is the up edge timing of the clock signal SCK during the unit clock period P[32]. In the error determination timing $t_{RJ}$, whether only the second communication error condition is established is determined.

Specifically, the error detection circuit 11 in the read mode compares the value of the data $FC_{RM}$[1] to $FC_{RM}$[0] received during the current selection period with the value of the data $FC_{RM}$[1] to $FC_{RM}$[0] received during the previous selection period, and when they match each other, the error detection circuit 11 determines that the second communication error condition is established. When the second communication error condition is established, the error detection circuit 11 determines that a communication error has occurred. When the second communication error condition is not established, the error detection circuit 11 determines that no communication error has occurred.

As a special note, the control circuit 10 in the read mode sets the error flag output period in the selection period, and outputs, during the error flag output period, an error flag signal ERRB corresponding to the value of the error flag $E_{FLG}$ from the terminal T_SDO. In the example of FIG. 9, the unit clock period P[1] corresponds to the error flag output period. Hence, when the MCU 2 causes the gate driver 1 to perform the read operation, the MCU 2 only turns the signal CSB low to be able to immediately recognize whether a flag correspondence error has occurred.

In a case where a communication error corresponds to a flag correspondence error, when it is determined that a communication error has occurred in the SPI communication during a certain selection period, the control circuit 10 outputs, from the terminal T_SDO, a signal of the error flag $E_{FLG}$ of "1" (that is, a low-level error flag signal ERRB) during the error flag output period in the subsequent selection period.

Figure 10:
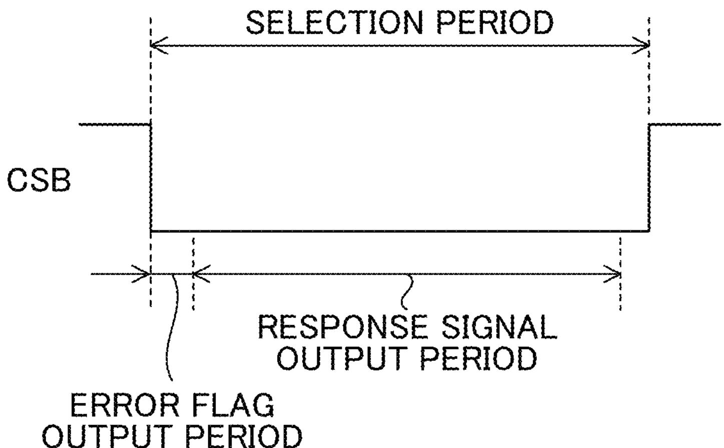
FIG. 10 is a diagram showing a relationship between a selection period, an error flag output period and a response signal output period in the embodiment of the present disclosure.

With reference to FIG. 10, the operation of the control circuit 10 related to the selection period will be additionally described. The selection period includes the error flag output period and the response signal output period which are separate from each other. The control circuit 10 receives, during the selection period, as the input data signal SDI, a signal applied to the terminal T_SDI in synchronization with the clock signal SCK applied to the terminal T_SCK and performs the corresponding operation corresponding to the input data signal SDI during the selection period or after the selection period. The corresponding operation is the write operation or the read operation. The selection period can further include another period in addition to the error flag output period and the response signal output period.

The control circuit 10 in the write mode can output, during the response signal output period, as the signal SDO, the response signal related to the write operation from the terminal T_SDO. Here, the response signals related to the write operation are signals corresponding to the input data signal SDI (that is, signals corresponding to the data $FC_{WM}$[1] to $FC_{WM}$[0], the data $A_{WM}$[4] to $A_{WM}$[0] and the data $D_{WM}$[15] to $D_{WM}$[0]), and include the frame counter signal, the address signal and the write data signal received at the terminal T_SDI and the error detection code signal (the signal of the error detection code). In the write mode, the frame counter signal, the address signal, the write data signal and the error detection code signal included in the response signals are indicated by the data $FC_{WS}$[1] to $FC_{WS}$[0], the data $A_{WS}$[4] to $A_{WS}$[0], the data $D_{WS}$[15] to $D_{WS}$[0] and the data $CRC_{WS}$[7] to $CRC_{WS}$[0] (see FIG. 6). The control circuit 10 in the write mode can output the error flag signal ERRB from the terminal T_SDO during the error flag output period.

The control circuit 10 in the read mode can output, during the response signal output period, as the signal SDO, the response signal related to the read operation from the terminal T_SDO. Here, the response signals related to the read operation are signals corresponding to the input data signal SDI (that is, signals corresponding to the data $FC_{RM}$ [1] to $FC_{RM}$[0] and the data $A_{RM}$[4] to $A_{RM}$[0]), and include the frame counter signal and the address signal received at the terminal T_SDI, and include the read data signal and the error detection code signal (the signal of the error detection code). In the read mode, the frame counter signal, the address signal, the read data signal and the error detection code signal included in the response signals are indicated by the data $FC_{RS}$[1] to $FC_{RS}$[0], the data $A_{RS}$[4] to $A_{RS}$[0], the data $D_{RS}$[15] to $D_{RS}$[0] and the data $CRC_{RS}$[7] to $CRC_{RS}$[0] (see FIG. 9). The control circuit 10 in the read mode can output the error flag signal ERRB from the terminal T_SDO during the error flag output period.

Figure 11:
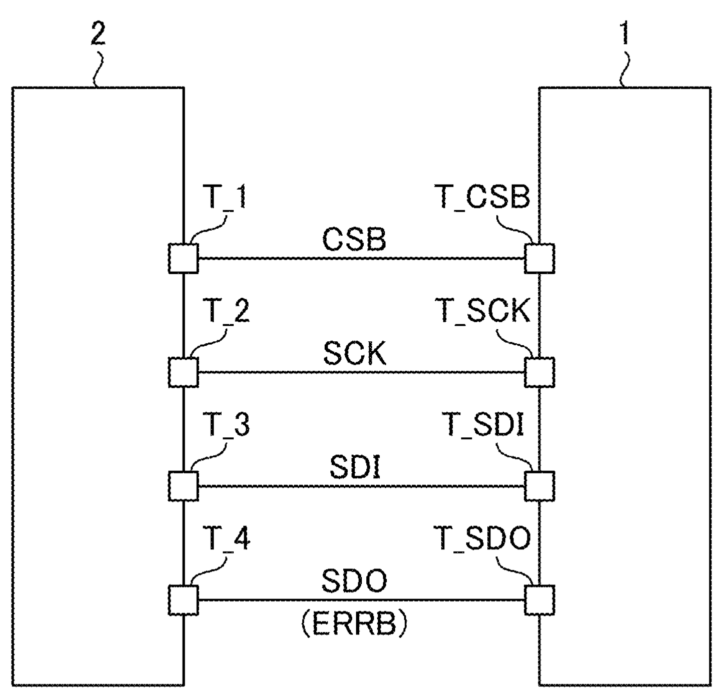
FIG. 11 is a diagram showing a terminal group and a signal group related to the SPI communication in the embodiment of the present disclosure.

With reference to FIG. 11, it is said that during the error flag output period, the signal SDO functions as the error flag signal ERRB. The terminal T_SDO functions both to output the response signal SDO related to the write or read operation and to output the error flag signal ERRB.

Regarding the read mode, the response signal output period can be considered to be divided into a first response signal output period and a second response signal output period. The control circuit 10 in the read mode outputs a signal of storage data in the read target address as a first response signal (signal of the data $D_{RS}$[15] to $D_{RS}$[0]) from the terminal T_SDO during the first response signal output period, and outputs a second response signal from the terminal T_SDO during the second response signal output period. Here, the second response signals are signals of the data $FC_{RS}$[1] to $FC_{RS}$[0], the data $A_{RS}$[4] to $A_{RS}$[0] and the data $CRC_{RS}$[7] to $CRC_{RS}$[0]. The signal of the data $FC_{RS}$[1] to $FC_{RS}$[0] corresponds to the frame counter signal received at the terminal T_SDI. The signal of the data $A_{RS}$[4] to $A_{RS}$[0] corresponds to the address signal received at the terminal T_SDI. The signal of the data $CRC_{RS}$[7] to $CRC_{RS}$ [0] indicates the error detection code derived in the control circuit 10 based on the storage data ($D_{RS}$[15] to $D_{RS}$[0]) in the read target address.

Among a plurality of Examples, some configuration examples, operation examples, application techniques or variation techniques and the like related to the present embodiment will be described below. The matters described above in the present embodiment are applied to the following Examples unless otherwise specified and without contradiction. If in the Examples, there are any matters that contradict the matters described above, the description in the Examples may take precedence. As long as there is no contradiction, matters described in any of the following Examples can be applied to any of the other Examples (that is, any two or more of the Examples can be combined together).

First Example

A first Example will be described. In the first Example, the advantages of a configuration according to the present disclosure will be described with the assumption that a plurality of slave devices are provided.

Figure 12:
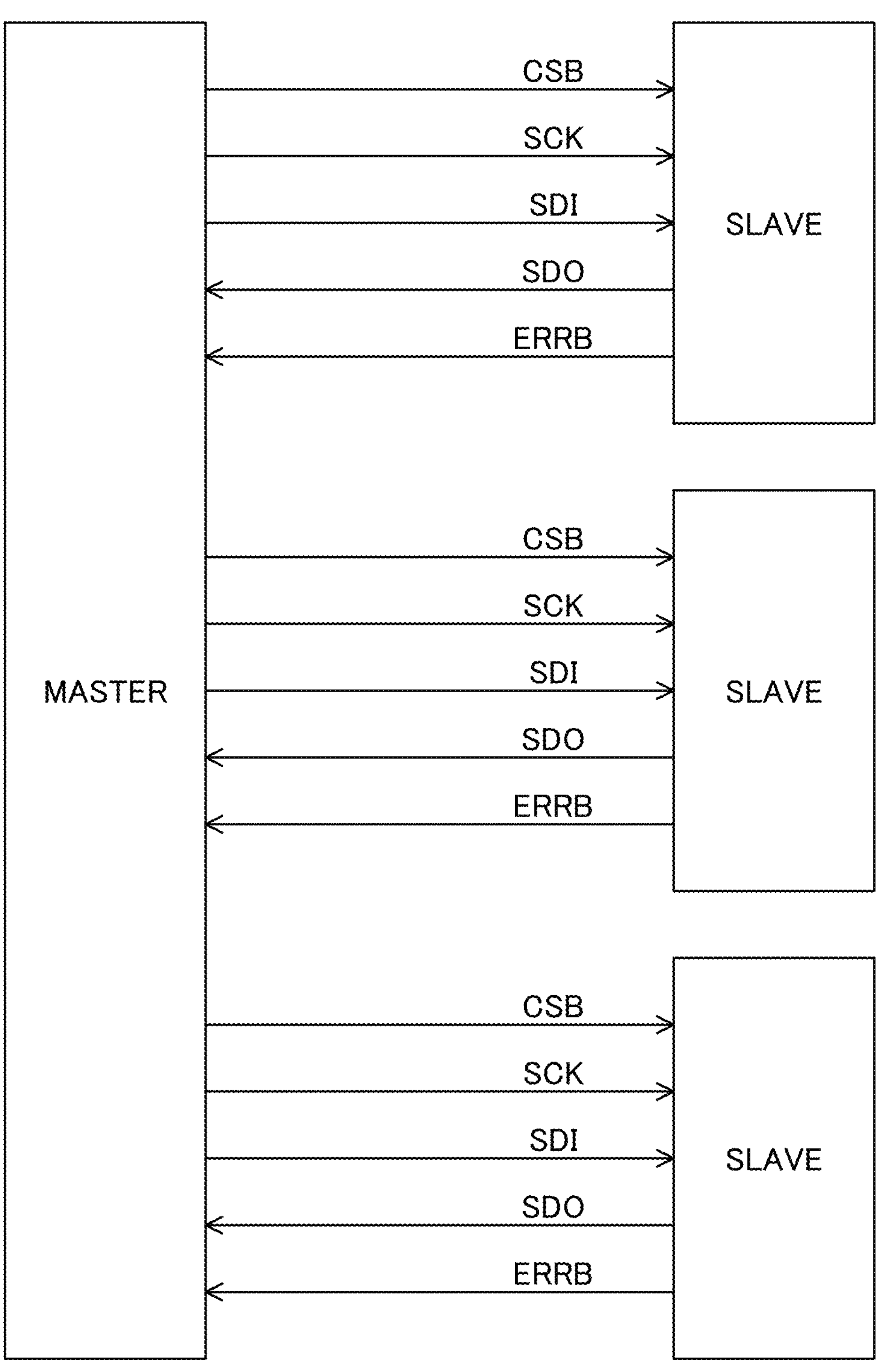
FIG. 12 is a diagram showing a first reference configuration related to the SPI communication.

A first reference configuration related to the SPI communication is shown in FIG. 12. In the first reference configuration, a master device is connected to each of the slave devices with five dedicated communication lines. In the first reference configuration, four communication lines out of the five communication lines are used to transmit signals CSB, SCK, SDI and SDO, and the one communication line is used to transmit a signal ERRB. In the first reference configuration, for each of the slave devices, five external terminals need to be provided in the master device, and in each of the slave devices, five external terminals need to be provided. As described above, in the first reference configuration, the number of external terminals necessary for the master device and the slave devices is increased. By the increase in the numbers of external terminals, the sizes and costs of the master device and the slave devices are prevented from being reduced. In the first reference configuration, the five communication lines are needed for each of the slave devices. By the increase in the number of communication lines, the size and cost of an overall system are prevented from being reduced.

Figure 13:
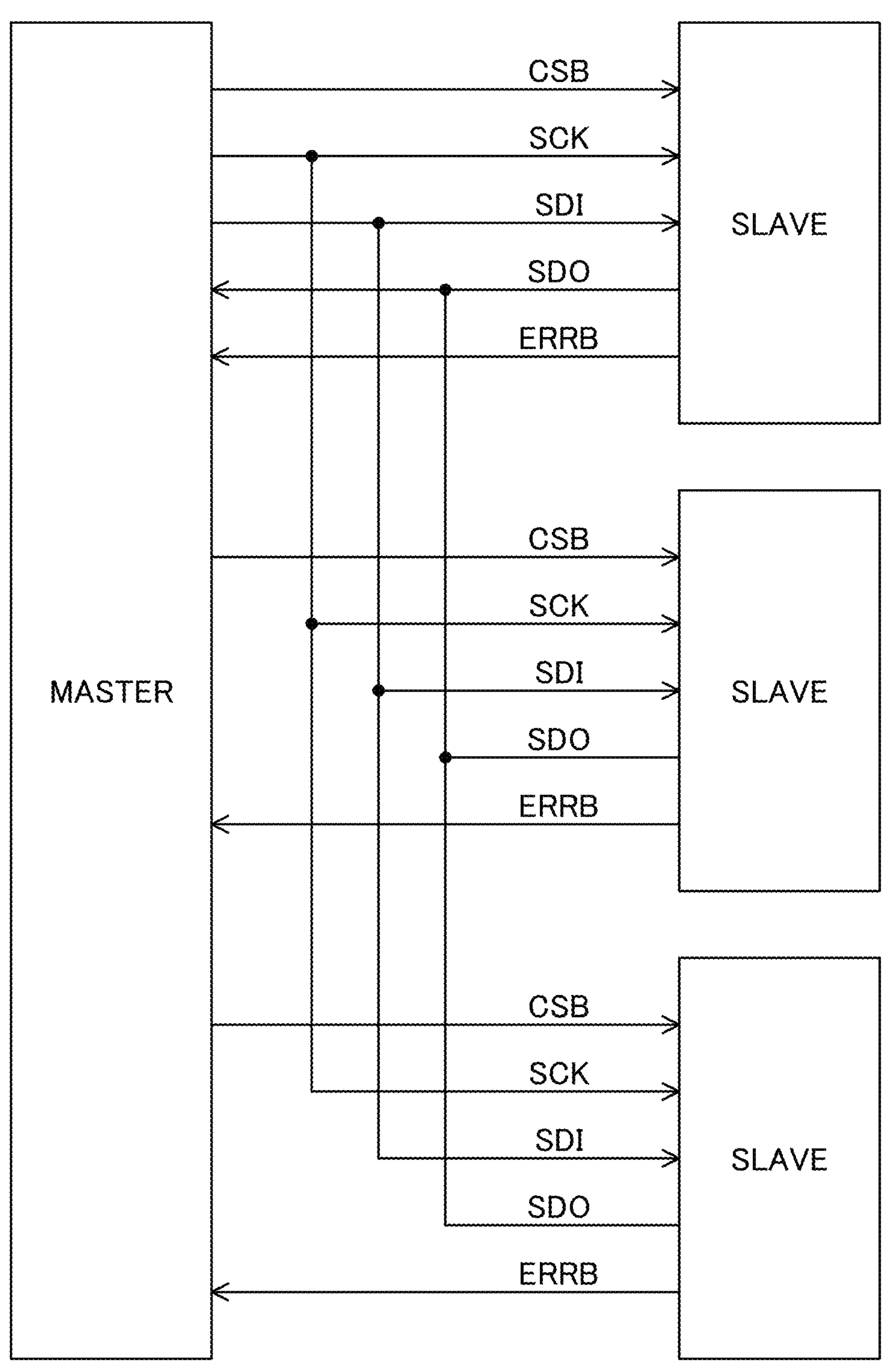
FIG. 13 is a diagram showing a second reference configuration related to the SPI communication.

A second reference configuration related to the SPI communication is shown in FIG. 13. In the second reference configuration, the master device and each of the slave devices are connected with two dedicated communication lines, and for each of the slave devices, the two dedicated communication lines are used to transmit the signals CSB and ERRB. Moreover, in the second reference configuration, the master device and the slave devices are connected with three buses. The three buses are shared by the slave devices, and the three buses are used to transmit the signals SCK, SDI and SDO. In the second reference configuration, as compared with the first reference configuration, it is possible to reduce the number of necessary external terminals in the master device related to the SPI communication. If the total number of slave devices is three, the number of necessary external terminals in the master device related to the SPI communication can be reduced to nine.

Figure 14:
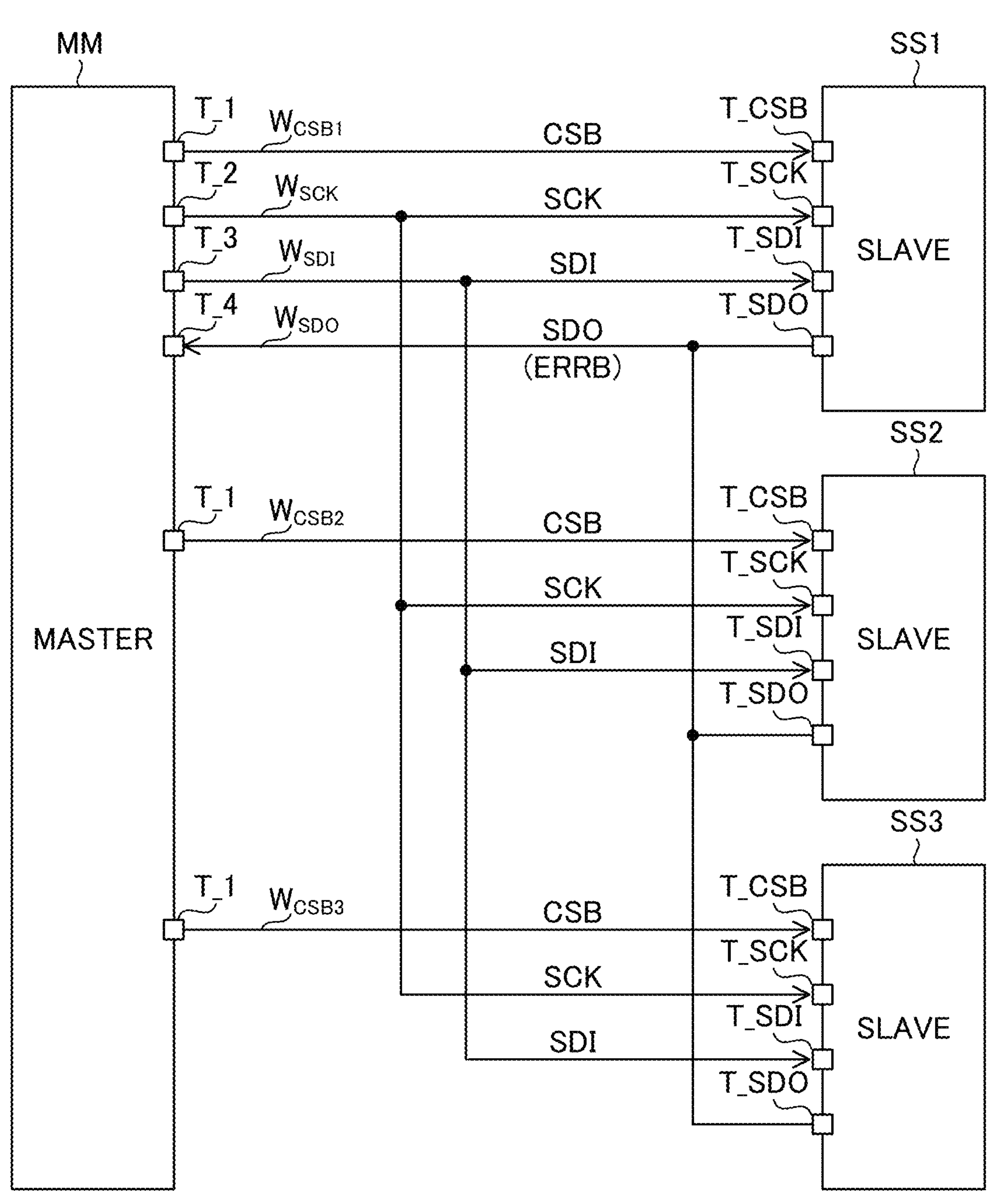
FIG. 14 is a diagram showing a connection relationship between a mater device and three slave devices in a first Example in embodiment of the present disclosure.

By contrast, the technique in the present disclosure is utilized, and thus it is possible to configure a system as shown in FIG. 14. In the system of FIG. 14, a master device MM and three slave devices SS1 to SS3 are provided. The MCU 2 is an example of the master device MM, and the gate driver 1 is an example of the slave devices SS1 to SS3. In order to realize the SPI communication, a total of six wires $W_{CSB1}$ to $W_{CSB3}$, $W_{SCK}$, $W_{SDI}$ and $W_{SDO}$ which connect the master device MM and the slave devices SS1 to SS3 are provided. The master device MM respectively transmits dedicated signals CSB to the slave devices SS1 to SS3 through the wires $W_{CSB1}$ to $W_{CSB3}$. The master device MM transmits a common signal SCK to the slave devices SS1 to SS3 through the wire $W_{SCK}$. The master device MM transmits a common signal SDI to the slave devices SS1 to SS3 through the wire $W_{SCI}$. The slave devices SS1 to SS3 output a signal SDO to the master device MM through the common wire $W_{SDO}$. The signal SDO during the error flag output period functions as the error flag signal ERRB.

In order to give a specific description, it is assumed that the MCU 2 is the master device MM and the slave devices SS1 to SS3 are first to third gate drivers 1, respectively. Hence, in the MCU 2, three terminals T_1 (also see FIG. 1) are provided. The three terminals T_1 are referred to as first to third terminals T_1. The first terminal T_1 is connected through the wire $W_{CSB1}$ to the terminal T_CSB of the first gate driver 1 (SS1), the second terminal T_1 is connected through the wire $W_{CSB2}$ to the terminal T_CSB of the second gate driver 1 (SS2) and the third terminal T_1 is connected through the wire $W_{CSB3}$ to the terminal T_CSB of the third gate driver 1 (SS3). The wires $W_{SCK}$, $W_{SDI}$ and $W_{SDO}$ are wires (buses) which are commonly provided for the first to third gate drivers 1. The terminal T_2 (see FIG. 1) in the MCU 2 is commonly connected to the terminals T_SCK in the first to third gate drivers 1 through the wire $W_{SCK}$. The terminal T_3 (see FIG. 1) in the MCU 2 is commonly connected to the terminals T_SDI in the first to third gate drivers 1 through the wire $W_{SDI}$. The terminal T_4 (see FIG. 1) in the MCU 2 is commonly connected to the terminals T_SCO in the first to third gate drivers 1 through the wire $W_{SDO}$.

In the system of FIG. 14, the MCU 2 turns only one of potentials of the wires $W_{CSB1}$ to $W_{CSB3}$ low to select only one of the first to third gate drivers 1 as a communication partner. The gate driver 1 selected as the communication partner outputs the error flag signal ERRB from its own terminal T_SDO during the error flag output period in the selection period, and outputs the response signal from its own terminal T_SDO during a response signal output period. Here, the terminals T_SDO of the other gate drivers 1 are in the Hi-Z state, and thus no output contention occurs.

In the configuration of the present disclosure, as compared with the first and second reference configurations (FIGS. 12 and 13), it is possible to reduce the number of necessary external terminals in the master device and the slave devices, and it is also possible to reduce the number of necessary wires (that is, it is possible to realize a reduction in the number of terminals and a reduction in the number of wires). This contributes to reductions in the sizes and costs of the master device and the slave devices, and also contributes to reductions in the sizes and costs of the entire system.

Although in order to give a specific description, the example where the slave devices SS1 to SS3 are assumed to be all the gate drivers 1 is provided, the slave devices SS1 to SS3 may be different types of slave devices (the same is true in a second Example). In other words, any slave device which has the same terminal configuration as the gate driver 1 may be the slave device SS1, SS2 or SS3 (the same is true in the second Example). The total number of slave devices connected to the master device MM is arbitrary (the same is true in the second Example).

Second Example

Figure 15:
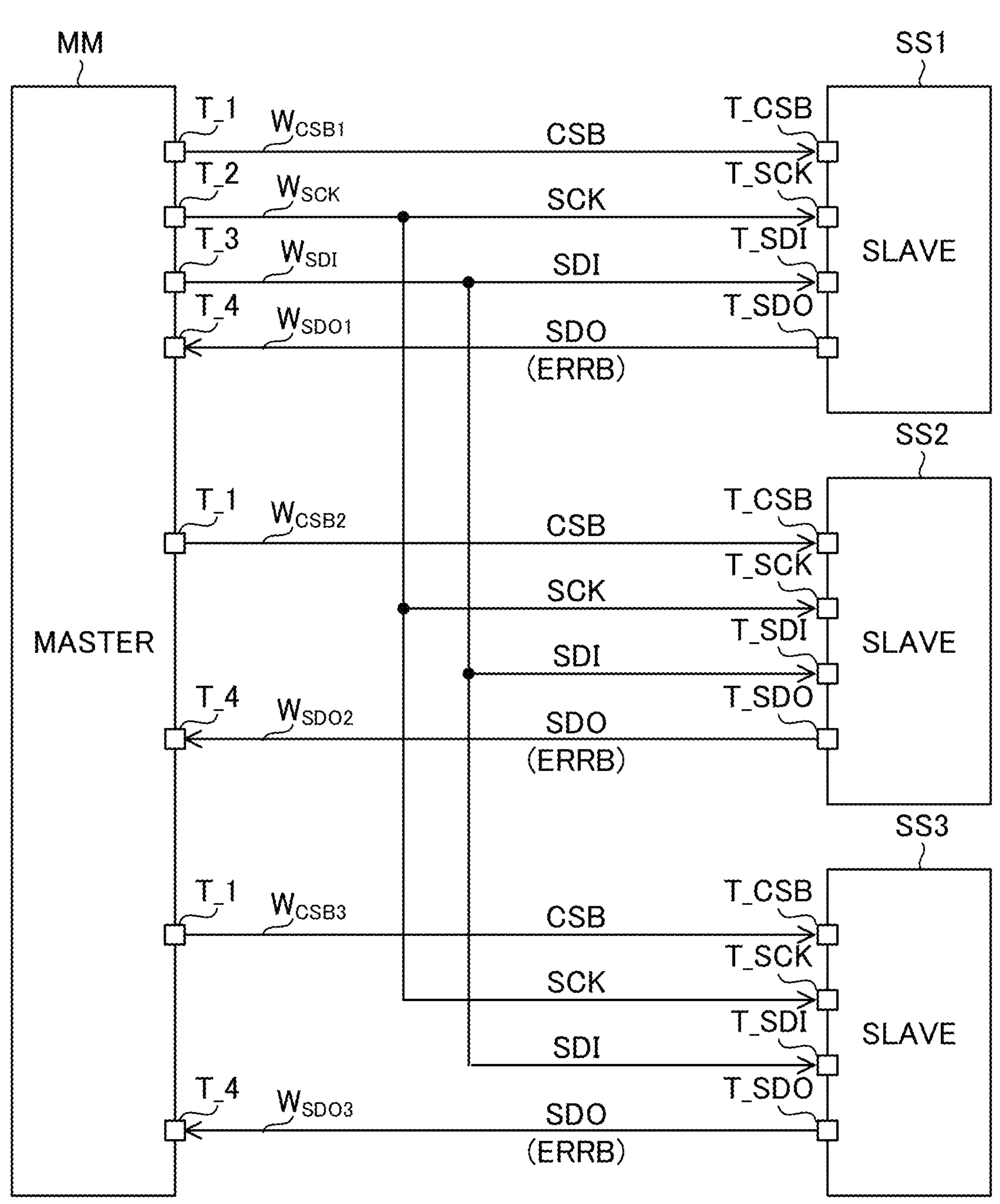
FIG. 15 is a diagram showing a connection relationship between a mater device and three slave devices in a second Example in embodiment of the present disclosure.

A second Example will be described. A system as shown in FIG. 15 may be configured. In the system of FIG. 15, a master device MM and three slave devices SS1 to SS3 are provided. In the system of FIG. 15, in order to realize the SPI communication, a total of eight wires $W_{CSB1}$ to $W_{CSB3}$, $W_{SCK}$, $W_{SDI}$ and $W_{SDO1}$ to $W_{SDO3}$ which connect the master device MM and the slave devices SS1 to SS3 are provided. The master device MM respectively transmits dedicated signals CSB to the slave devices SS1 to SS3 through the wires $W_{CSB1}$ to $W_{CSB3}$. The master device MM transmits a common signal SCK to the slave devices SS1 to SS3 through the wire $W_{SCK}$. The master device MM transmits a common signal SDI to the slave devices SS1 to SS3 through the wire $W_{SDI}$. As described above, the wires $W_{CSB1}$ to $W_{CSB3}$, $W_{SCK}$ and $W_{SDI}$ are the same as those in the system of FIG. 14.

However, in the system of FIG. 15, the slave devices SS1 to SS3 respectively output signals SDO to the master device MM through the dedicated wires $W_{SDO1}$ to $W_{SDO3}$. The signal SDO during the error flag output period functions as the error flag signal ERRB.

In order to give a specific description, it is assumed that the MCU 2 is the master device MM and the slave devices SS1 to SS3 are first to third gate drivers 1, respectively. As in the system of FIG. 14, first to third terminals T_1 are provided in the MCU 2. A method for connecting the first to third terminals T_1, and terminals T_2 and T_3 to the terminals T_CSB, T_SCK and T_SDI in the gate drivers 1 is as described in the first Example. However, in the system of FIG. 15, three terminals T_4 (see FIG. 1) are provided in the MCU 2. The three terminals T_4 are referred to as first to third terminals T_4. The first terminal T_4 is connected to the terminal T_SDO of the first gate driver 1 (SS1) through the wire $W_{SDO1}$, the second terminal T_4 is connected to the terminal T_SDO of the second gate driver 1 (SS2) through the wire $W_{SDO2}$ and the third terminal T_4 is connected to the terminal T_SDO of the third gate driver 1 (SS3) through the wire $W_{SDO3}$.

In the system of FIG. 15, the MCU 2 turns only one of potentials of the wires $W_{CSB1}$ to $W_{CSB3}$ low to select only one of the first to third gate drivers 1 as a communication partner. The gate driver 1 selected as the communication partner outputs the error flag signal ERRB from its own terminal T_SDO during the error flag output period in the selection period, and outputs the response signal from its own terminal T_SDO during the response signal output period. Since in the system of FIG. 15, the dedicated wire ($W_{SDO1}$, $W_{SDO2}$ or $W_{SDO3}$) is connected to the terminal T_SDO in each of the gate drivers 1, the gate driver 1 can output the error flag signal ERRB from the terminal T_SDO during its own non-selection period. The same is true for a case where only one slave device is connected to the master device.

Third Example

A third Example will be described. Data EREN is stored in any bit in the unit storage regions UM[0] to UM[31]. The data EREN is one-bit data which has a value of "0" or "1". The MCU 2 causes the control circuit 10 to perform the write operation to be able to freely specify the value of the data EREN. The initial value of the data EREN is "0".

The control circuit 10 performs switching control on whether to output the error flag signal ERRB according to the value of the data EREN during the non-selection period. Specifically, when the data EREN has the value of "0", the control circuit 10 brings the terminal T_SDO into the hi-Z state as shown in FIGS. 6 and 9 during the non-selection period to stop the output of the error flag signal ERRB from the terminal T_SDO. By contrast, when the data EREN has the value of "1", the control circuit 10 outputs the error flag signal ERRB from the terminal T_SDO during the non-selection period. Hence, in a case where "EREN=1", when "$E_{FLG}$=1", the control circuit 10 keeps the potential of the terminal T_SDO low during the non-selection period (that is, outputs a low-level error flag signal ERRB from the terminal T_SDO) whereas when "$E_{FLG}$=0", the control circuit 10 keeps the potential of the terminal T_SDO high during the non-selection period (that is, outputs a high-level error flag signal ERRB from the terminal T_SDO). The data EREN is an example of setting information, and the control circuit 10 is operated according to the setting information in a first setting state or a second setting state. The state of "EREN=1" corresponds to the first setting state, and the state of "EREN=0" corresponds to the second setting state.

When the system as shown in FIG. 14 is configured with a priority given to reducing the number of terminals and the number of wires, the SPI communication is preferably performed in the state of "EREN=0". When the system as shown in FIG. 15 is configured or when only one slave device is connected to the master device, the SPI communication can be performed in the state of "EREN=1". In the state of "EREN=1", the occurrence of the flag correspondence error can be notified to the MCU 2 even during the non-selection period.

Fourth Example

A fourth Example will be described. The error flag output period may be provided anywhere during the selection period.

Figure 16:
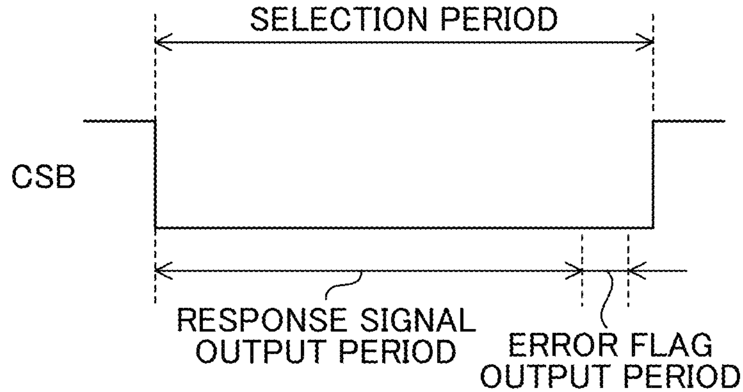
FIG. 16 is a diagram showing a relationship between a selection period, an error flag output period and a response signal output period in a fourth Example in embodiment of the present disclosure.

For example, as shown in FIG. 16, during the selection period, the error flag output period may be provided after the response signal output period. In this case, the control circuit 10 outputs the error flag signal ERRB from the terminal T_SDO after the completion of the output of the response signal from the terminal T_SDO. When the method of FIG. 16 is adopted, for example, the control circuit 10 may add a unit clock period P[33] to the selection period, and output the error flag signal ERRB during the unit clock period P[33].

Figure 17:
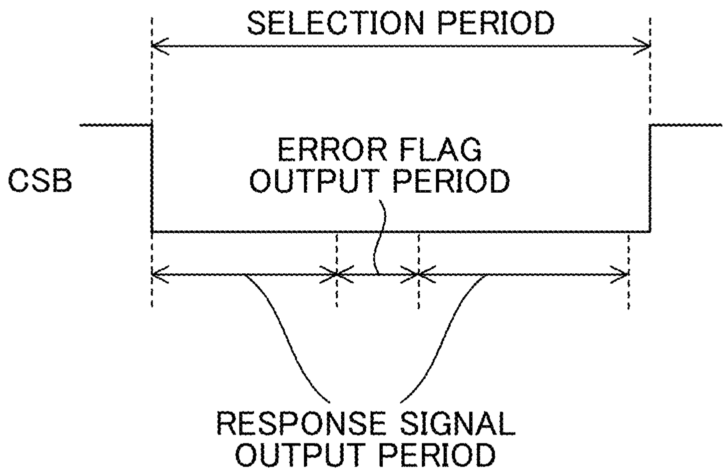
FIG. 17 is a diagram showing a relationship between the selection period, the error flag output period and the response signal output period in the fourth Example in embodiment of the present disclosure.

For example, as shown in FIG. 17, during the selection period, the error flag output period may be provided halfway through the response signal output period. In this case, the control circuit 10 outputs the error flag signal ERRB from the terminal T_SDO after outputting a part of the response signal from the terminal T_SDO, and thereafter outputs the remaining part of the response signal from the terminal T_SDO.

Preferably, when the method of FIG. 17 is applied to the write mode (see FIG. 6), for example, the unit clock period P[33] is added to the selection period, and then the control circuit 10 transmits the signals of the data $FC_{WS}$[1] to $FC_{WS}$[0] and the data $A_{WS}$[4] to $A_{WS}$[0] during the unit clock periods P[2] to P[8], and thereafter transmits the error flag signal ERRB during the unit clock period P[9]. Then, the control circuit 10 preferably transmits the signals of the data $D_{WS}$[15] to $D_{WS}$[0] and the data $CRC_{WS}$[7] to $CRC_{WS}$[0] during the unit clock periods P[10] to P[33]. However, the insertion position of the error flag output period is arbitrary.

Preferably, when the method of FIG. 17 is applied to the read mode (see FIG. 9), for example, the unit clock period P[33] is added to the selection period, and then the control circuit 10 transmits the signals of the data $FC_{RS}$[1] to $FC_{RS}$[0] and the data $A_{RS}$[4] to $A_{RS}$[0] during the unit clock periods P[2] to P[8], and thereafter transmits the error flag signal ERRB during the unit clock period P[9]. Then, the control circuit 10 preferably transmits the signals of the data $D_{RS}$[15] to $D_{RS}$[0] and the data $CRC_{RS}$[7] to $CRC_{RS}$[0] during the unit clock periods P[10] to P[33]. However, the insertion position of the error flag output period is arbitrary.

However, as in the example of FIG. 6 or FIG. 9, the unit clock period P[1] is preferably assigned to the error flag output period. The reason why the unit clock period P[1] is preferably assigned to the error flag output period is that the MCU 2 only turns the signal CSB low to be able to immediately recognize whether the flag correspondence error has occurred and to immediately take countermeasures against the occurrence of the flag correspondence error. When the unit clock period P[1] is assigned to the error flag output period, in the method of FIG. 16 or 17, it is not necessary to add the unit clock period P[33] to be needed.

Fifth Example

A fifth Example will be described.

The transmission and reception of the data $FC_{WM}$[1] to $FC_{WM}$[0] in the write mode may be omitted (see FIG. 6), and if the transmission and reception of the data $FC_{WM}$[1] to $FC_{WM}$[0] is omitted, the transmission and reception of the data $FC_{WS}$[1] to $FC_{WS}$[0] is not performed. In this case, the error detection code resulting from the data $CRC_{WM}$[7] to $CRC_{WM}$[0] is derived in the MCU 2 based on only the write target address ($A_{WM}$[4] to $A_{WM}$[0]) and the write data ($D_{WM}$[15] to $D_{WM}$[0]) transmitted by the MCU 2, and the error detection code resulting from the data $CRC_{WS}$[7] to $CRC_{WS}$[0] is derived in the control circuit 10 based on only the write target address (that is, the data $A_{WM}$[4] to $A_{WM}$[0]) and the write data (that is, the $D_{WM}$[15] to $D_{WM}$[0]) received by the gate driver 1.

The minimum requirements for the write mode are the transmission and reception of the data $A_{WM}$[4] to $A_{WM}$[0] and the transmission and reception of the data $D_{WM}$[15] to $D_{WM}$[0]. Hence, in the write mode, the transmission and reception of the data $CRC_{WM}$[7] to $CRC_{WM}$[0] may be omitted. Likewise, in the write mode, the transmission and reception of the data $CRC_{WS}$[7] to $CRC_{WS}$[0] may be omitted. In the write mode, the transmission and reception of the data $A_{WS}$[4] to $A_{WS}$[0] may be omitted. Likewise, in the write mode, the transmission and reception of the data $D_{WS}$[15] to $D_{WS}$[0] may be omitted.

The minimum requirements for the read mode are the transmission and reception of the data $A_{RM}$[4] to $A_{RM}$[0] and the transmission and reception of the data $D_{RS}$[15] to $D_{RS}$[0] (see FIG. 9). Hence, in the read mode, the transmission and reception of the data $FC_{RM}$[1] to $FC_{RM}$[0] may be omitted, and if the transmission and reception of the data $FC_{RM}$[1] to $FC_{RM}$[0] is omitted, the transmission and reception of the data $FC_{RS}$[1] to $FC_{RS}$[0] is not performed. In the read mode, the transmission and reception of the data $A_{RS}$[4] to $A_{RS}$[0] may be omitted. In the read mode, the transmission and reception of the data $CRC_{RS}$[7] to $CRC_{RS}$[0] may be omitted.

Sixth Example

A sixth Example will be described.

In each selection period, the length of the error flag output period may be set equal to or greater than twice the clock cycle.

The control circuit 10 in the write mode may continuously output the error flag signal ERRB from the terminal T_SDO over the entire selection period. The control circuit 10 in the read mode may continuously output the error flag signal ERRB from the terminal T_SDO except a period during which the data $D_{RS}$[15] to $D_{RS}$[0] is output from the terminal T_SDO in the selection period.

The system SYS of FIG. 1 is suitable for in-vehicle applications. In other words, the system SYS may be installed in a vehicle (not shown) such as an automobile. There is a strong demand for a reduction in the number of terminals or a reduction in the number of wires for in-vehicle electronic components, and thus the technique in the present disclosure is useful. A vehicle includes, in addition to the system SYS, an engine (not shown) which generates power for causing the vehicle to travel, a battery (not shown) formed of a secondary battery and the like. The engine includes an internal-combustion engine or a motor. The motor in the engine may be the motor 3. However, regardless of in-vehicle applications, the system SYS can be utilized for any applications.

Although the embodiment in which the technique in the present disclosure is applied to the gate driver 1 has been described above, the technique in the present disclosure can be applied to any semiconductor devices which perform the SPI communication. The gate driver 1 is an example of the semiconductor device. The technique in the present disclosure can be applied to any types of semiconductor devices such as an LED driver, a power supply switching device and a memory device. Any electronic device which includes the semiconductor device according to the present disclosure may be configured. Examples of the electronic device include an in-vehicle ECU (Electronic Control Unit), a smart phone, a tablet, a personal computer, a game device, a television receiver and the like.

A relationship between a high level and a low level for any signal or voltage can be reversed in the above description without departing from the spirit described above.

The types of channels of the FETs (field effect transistor) shown in the embodiment are merely examples. Without departing from the spirit described above, the type of channel of any FET can be changed between a P-channel type and a N-channel type.

As long as no disadvantage occurs, any of the transistors described above may be any type of transistor. For example, as long as no disadvantage occurs, any of the transistors described above as MOSFETs can be replaced with a junction FET, an IGBT (Insulated Gate Bipolar Transistor) or a bipolar transistor. Any of the transistors includes a first electrode, a second electrode and a control electrode. In an FET, one of the first and second electrodes is the drain, the other is the source and the control electrode is the gate. In an IGBT, one of the first and second electrodes is the collector, the other is the emitter and the control electrode is the gate. In a bipolar transistor which does not belong to the IGBT, one of the first and second electrodes is the collector, the other is the emitter and the control electrode is the base.

The embodiment of the present disclosure can be changed in various ways as necessary within the scope of technical ideas indicated in scope of claims. The above embodiment is merely an example of the embodiment of the present disclosure, and the meanings of terms in the present disclosure and constituent elements are not limited to those described in the above embodiment. The specific numerical values shown in the above description are merely examples, and they can naturally be changed to various numerical values.

ADDITIONAL DESCRIPTION

An additional description for the present disclosure in which specific configuration examples have been described in the above embodiment is provided.

A semiconductor device (1) (see FIGS. 1, 3, 6 and 9) according to one aspect of the present disclosure is configured to include: a selection input terminal (T_CSB) configured to receive a selection signal (CSB); a clock input terminal (T_SCK); a data input terminal (T_SDI); and a data output terminal (T_SDO), and to be capable of performing serial communication, the semiconductor device includes a control circuit (10) configured to receive, as an input data signal (SDI), during a selection period in which the selection signal has a predetermined level (for example, a low-level), a signal applied to the data input terminal in synchronization with a clock signal (SCK) applied to the clock input terminal, and to perform a corresponding operation (a write operation or a read operation) corresponding to the input data signal during the selection period or after the selection period and the control circuit holds an error flag ($E_{FLG}$) indicating whether a specific error has occurred, outputs, during a part of the selection period, a response signal corresponding to the input data signal from the data output terminal and outputs, during another part of the selection period, an error flag signal corresponding to the value of the error flag from the data output terminal (first configuration).

In this way, it is possible to omit dedicated terminals and dedicated wires for transmission of the error flag signal. In other words, it is possible to realize a reduction in the number of terminals and a reduction in the number of wires. This contributes to reductions in the sizes and costs of devices for performing the serial communication, and also contributes to reductions in the sizes and costs of the entire system.

In the semiconductor device according to the first configuration (see FIG. 6 or 9), the control circuit may output the error flag signal from the data output terminal in response to the transition of the level of the selection signal from another level to the predetermined level, and thereafter output the response signal from the data output terminal (second configuration).

In this way, it is possible to rapidly transmit information of whether a specific error has occurred to a device on the other end immediately after the start of the selection period.

In the semiconductor device according to the second configuration (see FIG. 6 or 9), the clock signal (SCK) for a plurality of cycles may be applied to the clock input terminal during the selection period, and the control circuit may output, during the selection period, the error flag signal from the data output terminal in the first cycle for the clock signal, and output the response signal from the data output terminal in the second and subsequent cycles for the clock signal (third configuration).

In this way, it is possible to rapidly transmit information of whether a specific error has occurred to the device on the other end immediately after the start of the selection period.

In the semiconductor device according to the first configuration (see FIG. 16 or 17), the control circuit may output, during the selection period, the error flag signal from the data output terminal after completion of the output of the response signal from the data output terminal, or output, during the selection period, the error flag signal after a part of the response signal is output from the data output terminal and thereafter output the remaining part of the response signal from the data output terminal (fourth configuration).

In the semiconductor device according to any one of the first to fourth configurations (see FIG. 6), the control circuit may include a memory (12) and may be capable of performing, as the corresponding operation, a write operation on the memory in response to the reception of the input data signal, the input data signal when the write operation is performed may include an address signal indicating a write target address ($A_{WM}$[4] to $A_{WM}$[0]) in the memory and a write data signal indicating write data ($D_{WM}$[15] to $D_{WM}$[0]) to be written to the write target address and the control circuit may write, during the write operation, the write data in the write target address in the memory (fifth configuration).

In this way, when the write operation is performed, the error flag signal can be transmitted to the device on the other end.

In the semiconductor device according to the fifth configuration, when the write operation is performed, the selection period may include an error flag output period and a response signal output period, the control circuit may output the error flag signal from the data output terminal during the error flag output period, and output the response signal from the data output terminal during the response signal output period and the response signal when the write operation is performed may include the address signal and the write data signal which have been received and a signal of an error detection code (sixth configuration).

In this way, it is possible to transmit the error flag signal to the device on the other end while transmitting the response signal necessary for the write operation.

In the semiconductor device according to any one of the first to fourth configurations (see FIG. 9), the control circuit may include a memory (12) and may be capable of performing, as the corresponding operation, a read operation on the memory in response to the reception of the input data signal, the input data signal when the read operation is performed may include an address signal indicating a read target address ($A_{RM}$[4] to $A_{RM}$[0]) in the memory, when the read operation is performed, the selection period may include an error flag output period and a response signal output period and when the read operation is performed in response to the reception of the input data signal, the control circuit may output the error flag signal from the data output terminal during the error flag output period, and output the response signal including a signal of storage data ($D_{RS}$[15] to $D_{RS}$[0]) in the read target address from the data output terminal during the response signal output period (seventh configuration).

In this way, when the read operation is performed, the error flag signal can be transmitted to the device on the other end.

In the semiconductor device according to the seventh configuration, when the read operation is performed, the response signal output period may include a first response signal output period and a second response signal output period, the control circuit may output, as a first response signal, the signal of the storage data ($D_{RS}$[15] to $D_{RS}$[0]) in the read target address from the data output terminal during the first response signal output period, and output a second response signal from the data output terminal during the second response signal output period and the second response signal may include the address signal which has been received and a signal of an error detection code (eighth configuration).

In this way, it is possible to transmit the error flag signal to the device on the other end while transmitting the response signal necessary for the read operation.

In the semiconductor device according to any one of the first to eighth configurations, the control circuit may be operated in a first setting state or a second setting state based on setting information (EREN), and the control circuit may output, in the first setting state, the error flag signal from the data output terminal during a non-selection period in which the selection signal has another level different from the predetermined level, and stop, in the second setting state, the output of the error flag signal from the data output terminal during the non-selection period (ninth configuration).

In this way, it is possible to operate the semiconductor device in an appropriate setting state with consideration given to in what form the data output terminal is connected to the wire.

In the semiconductor device according to any one of the first to ninth configurations, the control circuit may include an error detection circuit (11) configured to detect whether a plurality of types of errors have occurred, and one or more errors of the plurality of types of errors may correspond to the specific error (tenth configuration).

The invention claimed is:

1. A semiconductor device configured to include: a selection input terminal configured to receive a selection signal; a clock input terminal; a data input terminal; and a data output terminal, and to be capable of performing serial communication, the semiconductor device comprising a control circuit configured to receive, as an input data signal, during a selection period in which the selection signal has a predetermined level, a signal applied to the data input terminal in synchronization with a clock signal applied to the clock input terminal, and to perform a corresponding operation corresponding to the input data signal during the selection period or after the selection period, wherein the control circuit holds an error flag indicating whether a specific error has occurred, outputs, during a part of the selection period, a response signal corresponding to the input data signal from the data output terminal and outputs, during another part of the selection period, an error flag signal corresponding to a value of the error flag from the data output terminal, wherein the control circuit includes a memory and is capable of performing, as the corresponding operation, a write operation on the memory in response to the reception of the input data signal, the input data signal when the write operation is performed includes:

an address signal indicating a write target address in the memory; and a write data signal indicating write data to be written to the write target address, the control circuit writes, during the write operation, the write data to the write target address in the memory, when the write operation is performed, the selection period includes an error flag output period and a response signal output period, the control circuit outputs the error flag signal from the data output terminal during the error flag output period, and outputs the response signal from the data output terminal during the response signal output period, and the response signal when the write operation is performed includes the address signal and the write data signal which have been received and a signal of an error detection code.

2. The semiconductor device according to claim 1, wherein the control circuit outputs the error flag signal from the data output terminal in response to transition of a level of the selection signal from another level to the predetermined level, and thereafter outputs the response signal from the data output terminal.

3. The semiconductor device according to claim 2, wherein the clock signal for a plurality of cycles is applied to the clock input terminal during the selection period, and the control circuit outputs, during the selection period, the error flag signal from the data output terminal in a first cycle for the clock signal, and outputs the response signal from the data output terminal in second and subsequent cycles for the clock signal.

4. The semiconductor device according to claim 1, wherein the control circuit outputs, during the selection period, the error flag signal from the data output terminal after completion of the output of the response signal from the data output terminal, or outputs, during the selection period, the error flag signal after a part of the response signal is output from the data output terminal and thereafter outputs a remaining part of the response signal from the data output terminal.

5. The semiconductor device according to claim 1, wherein the control circuit includes an error detection circuit configured to detect whether a plurality of types of errors have occurred, and one or more errors of the plurality of types of errors correspond to the specific error.

6. A semiconductor device configured to include: a selection input terminal configured to receive a selection signal; a clock input terminal; a data input terminal; and a data output terminal, and to be capable of performing serial communication, the semiconductor device comprising a control circuit configured to receive, as an input data signal, during a selection period in which the selection signal has a predetermined level, a signal applied to the data input terminal in synchronization with a clock signal applied to the clock input terminal, and to perform a corresponding operation corresponding to the input data signal during the selection period or after the selection period, wherein the control circuit holds an error flag indicating whether a specific error has occurred, outputs, during a part of the selection period, a response signal corresponding to the input data signal from the data output terminal and outputs, during another part of the selection period, an error flag signal corresponding to a value of the error flag from the data output terminal, wherein the control circuit includes a memory and is capable of performing, as the corresponding operation, a read operation on the memory in response to the reception of the input data signal, the input data signal when the read operation is performed includes an address signal indicating a read target address in the memory, when the read operation is performed, the selection period includes an error flag output period and a response signal output period and when the read operation is performed in response to the reception of the input data signal, the control circuit:

outputs the error flag signal from the data output terminal during the error flag output period, and outputs the response signal including a signal of storage data in the read target address from the data output terminal during the response signal output period, when the read operation is performed, the response signal output period includes a first response signal output period and a second response signal output period, the control circuit:

outputs, as a first response signal, the signal of the storage data in the read target address from the data output terminal during the first response signal output period; and outputs a second response signal from the data output terminal during the second response signal output period, and the second response signal includes the address signal which has been received and a signal of an error detection code.

7. The semiconductor device according to claim 6, wherein the control circuit outputs the error flag signal from the data output terminal in response to transition of a level of the selection signal from another level to the predetermined level, and thereafter outputs the response signal from the data output terminal.

8. The semiconductor device according to claim 7, wherein the clock signal for a plurality of cycles is applied to the clock input terminal during the selection period, and the control circuit outputs, during the selection period, the error flag signal from the data output terminal in a first cycle for the clock signal, and outputs the response signal from the data output terminal in second and subsequent cycles for the clock signal.

9. The semiconductor device according to claim 6, wherein the control circuit outputs, during the selection period, the error flag signal from the data output terminal after completion of the output of the response signal from the data output terminal, or outputs, during the selection period, the error flag signal after a part of the response signal is output from the data output terminal and thereafter outputs a remaining part of the response signal from the data output terminal.

10. The semiconductor device according to claim 6, wherein the control circuit includes an error detection circuit configured to detect whether a plurality of types of errors have occurred, and one or more errors of the plurality of types of errors correspond to the specific error.

11. A semiconductor device configured to include: a selection input terminal configured to receive a selection signal; a clock input terminal; a data input terminal; and a data output terminal, and to be capable of performing serial communication, the semiconductor device comprising a control circuit configured to receive, as an input data signal, during a selection period in which the selection signal has a predetermined level, a signal applied to the data input terminal in synchronization with a clock signal applied to the clock input terminal, and to perform a corresponding operation corresponding to the input data signal during the selection period or after the selection period, wherein the control circuit holds an error flag indicating whether a specific error has occurred, outputs, during a part of the selection period, a response signal corresponding to the input data signal from the data output terminal and outputs, during another part of the selection period, an error flag signal corresponding to a value of the error flag from the data output terminal, wherein the control circuit is operated in a first setting state or a second setting state based on setting information, and the control circuit:

outputs, in the first setting state, the error flag signal from the data output terminal during a non-selection period in which the selection signal has another level different from the predetermined level; and stops, in the second setting state, the output of the error flag signal from the data output terminal during the non-selection period.

12. The semiconductor device according to claim 11, wherein the control circuit outputs the error flag signal from the data output terminal in response to transition of a level of the selection signal from another level to the predetermined level, and thereafter outputs the response signal from the data output terminal.

13. The semiconductor device according to claim 12, wherein the clock signal for a plurality of cycles is applied to the clock input terminal during the selection period, and the control circuit outputs, during the selection period, the error flag signal from the data output terminal in a first cycle for the clock signal, and outputs the response signal from the data output terminal in second and subsequent cycles for the clock signal.

14. The semiconductor device according to claim 11, wherein the control circuit outputs, during the selection period, the error flag signal from the data output terminal after completion of the output of the response signal from the data output terminal, or outputs, during the selection period, the error flag signal after a part of the response signal is output from the data output terminal and thereafter outputs a remaining part of the response signal from the data output terminal.

15. The semiconductor device according to claim 11, wherein the control circuit includes an error detection circuit configured to detect whether a plurality of types of errors have occurred, and one or more errors of the plurality of types of errors correspond to the specific error.

* * * * *